(12) United States Patent
Jin et al.

(10) Patent No.: US 9,727,604 B2
(45) Date of Patent: Aug. 8, 2017

(54) GENERATING CODE FOR AN INTEGRATED DATA SYSTEM

(75) Inventors: Qi Jin, San Jose, CA (US); Hui Liao, Santa Clara, CA (US); Sriram K. Padmanabhan, San Jose, CA (US); Lin Xu, San Jose, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1218 days.

(21) Appl. No.: 11/372,540

(22) Filed: Mar. 10, 2006

(65) Prior Publication Data

US 2007/0214111 A1 Sep. 13, 2007

(51) Int. Cl.
*G06F 17/30* (2006.01)

(52) U.S. Cl.
CPC .. *G06F 17/30424* (2013.01); *G06F 17/30442* (2013.01); *G06F 17/30569* (2013.01)

(58) Field of Classification Search
CPC ............ G06F 17/30442; G06F 17/30569
USPC ........ 707/802, 809, 810; 717/104, 106, 144, 717/147, 155
See application file for complete search history.

(56) References Cited

U.S. PATENT DOCUMENTS

| | | | |
|---|---|---|---|
| 4,813,013 A | 3/1989 | Dunn | |
| 4,901,221 A | 2/1990 | Kodosky et al. | |
| 5,252,948 A | 10/1993 | Goris et al. | |
| 5,379,423 A | 1/1995 | Mutoh et al. | |
| 5,497,500 A | 3/1996 | Rogers et al. | |
| 5,577,253 A | 11/1996 | Blickstein | |
| 5,586,328 A * | 12/1996 | Caron et al. | 717/146 |
| 5,729,746 A | 3/1998 | Leonard | |
| 5,745,036 A | 4/1998 | Clare | |
| 5,758,160 A * | 5/1998 | McInerney et al. | 717/104 |
| 5,850,548 A | 12/1998 | Williams | |
| 5,857,180 A | 1/1999 | Hallmark et al. | |
| 5,920,721 A * | 7/1999 | Hunter et al. | 717/159 |
| 5,933,146 A | 8/1999 | Wrigley | |
| 5,940,593 A * | 8/1999 | House et al. | 709/203 |
| 5,942,978 A | 8/1999 | Shafer | |

(Continued)

FOREIGN PATENT DOCUMENTS

EP 0623904 A1 11/1994

OTHER PUBLICATIONS

U.S. Appl. No. 09/707,504, filed Nov. 7, 2000, Banavar et al.

(Continued)

*Primary Examiner* — Grace Park
(74) *Attorney, Agent, or Firm* — Patterson + Sheridan, LLP

(57) ABSTRACT

A computer implemented method for generating code for an integrated data system. A mixed data flow is received. The mixed data flow contains mixed data flow operators, which are associated with multiple runtime environments. A graph is generated containing logical operators based on the mixed data flow in response to receiving the mixed data flow. The logical operators are independent of the plurality of runtime environments. The graph is converted to a model. The logical operators are converted to model operators associated with the multiple runtime environments. The model operators allow for analysis of operations for the mixed data flow. The model is converted into an execution plan graph. The execution plan graph is executable on different runtime environments.

24 Claims, 16 Drawing Sheets

(56) References Cited

U.S. PATENT DOCUMENTS

| | | |
|---|---|---|
| 5,966,532 A | 10/1999 | McDonald et al. |
| 6,014,670 A | 1/2000 | Zamanian et al. |
| 6,043,746 A | 3/2000 | Sorrells |
| 6,044,217 A | 3/2000 | Brealey et al. |
| 6,098,153 A | 8/2000 | Fuld et al. |
| 6,177,289 B1 | 1/2001 | Crow et al. |
| 6,202,043 B1 | 3/2001 | Devoino et al. |
| 6,208,345 B1 | 3/2001 | Sheard et al. |
| 6,208,990 B1 | 3/2001 | Suresh et al. |
| 6,243,710 B1 | 6/2001 | DeMichiel et al. |
| 6,282,699 B1 | 8/2001 | Zhang et al. |
| 6,315,199 B1 | 11/2001 | Ito et al. |
| 6,434,739 B1 | 8/2002 | Branson et al. |
| 6,449,619 B1 | 9/2002 | Colliat et al. |
| 6,451,702 B1 | 9/2002 | Yang et al. |
| 6,480,842 B1 | 11/2002 | Agassi et al. |
| 6,507,279 B2 | 1/2003 | Loof |
| 6,538,299 B1 | 3/2003 | Kwark et al. |
| 6,598,790 B1 | 7/2003 | Horst |
| 6,604,110 B1* | 8/2003 | Savage et al. ............... 707/102 |
| 6,668,253 B1 | 12/2003 | Thompson et al. |
| 6,687,735 B1 | 2/2004 | Logston et al. |
| 6,720,595 B2 | 4/2004 | Clevenger et al. |
| 6,738,964 B1 | 5/2004 | Zink et al. |
| 6,772,409 B1 | 8/2004 | Chawla et al. |
| 6,795,790 B1 | 9/2004 | Lang et al. |
| 6,807,651 B2 | 10/2004 | Saluja et al. |
| 6,835,967 B2 | 12/2004 | Yeo et al. |
| 6,839,724 B2 | 1/2005 | Manchanda et al. |
| 6,839,726 B2 | 1/2005 | Kawamoto |
| 6,850,925 B2* | 2/2005 | Chaudhuri et al. ............... 707/2 |
| 6,928,431 B2* | 8/2005 | Dettinger et al. |
| 6,968,326 B2 | 11/2005 | Johnson et al. |
| 6,968,335 B2 | 11/2005 | Bayliss |
| 6,978,270 B1 | 12/2005 | Carty et al. |
| 7,003,560 B1 | 2/2006 | Mullen et al. |
| 7,010,779 B2* | 3/2006 | Rubin et al. ............... 717/106 |
| 7,031,987 B2 | 4/2006 | Mukkamalla et al. |
| 7,035,786 B1 | 4/2006 | Abu El Ata et al. |
| 7,076,765 B1* | 7/2006 | Omori ............... 717/121 |
| 7,103,590 B1 | 9/2006 | Murthy et al. |
| 7,191,183 B1 | 3/2007 | Goldstein |
| 7,209,925 B2 | 4/2007 | Srinivasan et al. |
| 7,221,032 B2 | 5/2007 | Kondo |
| 7,340,718 B2 | 3/2008 | Szladovics et al. |
| 7,343,585 B1 | 3/2008 | Lau et al. |
| 7,477,149 B2 | 1/2009 | Kangas |
| 7,493,311 B1* | 2/2009 | Cutsinger et al. |
| 7,499,917 B2 | 3/2009 | Purcell et al. |
| 7,526,468 B2* | 4/2009 | Vincent et al. |
| 7,575,815 B2 | 8/2009 | Henager, Jr. et al. |
| 7,689,576 B2 | 3/2010 | Rao et al. |
| 7,689,582 B2 | 3/2010 | Behnen et al. |
| 7,739,267 B2 | 6/2010 | Jin et al. |
| 7,747,563 B2 | 6/2010 | Gehring |
| 7,808,388 B2 | 10/2010 | Kangas |
| 7,810,067 B2 | 10/2010 | Kaelicke et al. |
| 7,941,460 B2 | 5/2011 | Bar-Or et al. |
| 8,230,384 B1 | 7/2012 | Krishnan et al. |
| 8,839,724 B2 | 9/2014 | Allen et al. |
| 8,903,762 B2 | 12/2014 | Jin et al. |
| 2002/0046301 A1 | 4/2002 | Shannon et al. |
| 2002/0066077 A1 | 5/2002 | Leung |
| 2002/0078262 A1* | 6/2002 | Harrison et al. ............... 709/331 |
| 2002/0116376 A1 | 8/2002 | Iwata et al. |
| 2002/0162090 A1 | 10/2002 | Parnell et al. |
| 2002/0170035 A1 | 11/2002 | Casati et al. |
| 2002/0198872 A1 | 12/2002 | MacNicol et al. |
| 2003/0033437 A1 | 2/2003 | Fischer et al. |
| 2003/0037322 A1 | 2/2003 | Kodosky et al. |
| 2003/0051226 A1 | 3/2003 | Zimmer et al. |
| 2003/0100198 A1 | 5/2003 | Hicks et al. |
| 2003/0101098 A1 | 5/2003 | Schaarschmidt |
| 2003/0110470 A1 | 6/2003 | Hanson et al. |
| 2003/0149556 A1 | 8/2003 | Riess |
| 2003/0154274 A1 | 8/2003 | Nakamura |
| 2003/0172059 A1 | 9/2003 | Andrei |
| 2003/0182651 A1 | 9/2003 | Secrist et al. |
| 2003/0229639 A1 | 12/2003 | Carlson et al. |
| 2003/0233374 A1 | 12/2003 | Spinola et al. |
| 2003/0236788 A1 | 12/2003 | Kanellos et al. |
| 2004/0054684 A1 | 3/2004 | Geels |
| 2004/0068479 A1 | 4/2004 | Wolfson et al. |
| 2004/0073886 A1 | 4/2004 | Irani |
| 2004/0107414 A1* | 6/2004 | Bronicki et al. ............... 717/105 |
| 2004/0143505 A1 | 7/2004 | Kovach |
| 2004/0143811 A1 | 7/2004 | Kaelicke et al. |
| 2004/0220923 A1 | 11/2004 | Nica |
| 2004/0254948 A1 | 12/2004 | Yao |
| 2005/0022157 A1 | 1/2005 | Brendle et al. |
| 2005/0040934 A1 | 2/2005 | Shanton |
| 2005/0040950 A1 | 2/2005 | Clacas |
| 2005/0044527 A1 | 2/2005 | Recinto |
| 2005/0055257 A1 | 3/2005 | Senturk et al. |
| 2005/0066283 A1* | 3/2005 | Kanamaru ............... 715/749 |
| 2005/0091664 A1 | 4/2005 | Cook et al. |
| 2005/0091684 A1 | 4/2005 | Kawabata et al. |
| 2005/0097103 A1 | 5/2005 | Zane et al. |
| 2005/0103842 A1 | 5/2005 | Bong |
| 2005/0108209 A1 | 5/2005 | Beyer et al. |
| 2005/0131881 A1 | 6/2005 | Ghosh et al. |
| 2005/0137852 A1 | 6/2005 | Chari et al. |
| 2005/0149914 A1 | 7/2005 | Krapf et al. |
| 2005/0174986 A1 | 8/2005 | Emond et al. |
| 2005/0174988 A1 | 8/2005 | Bieber et al. |
| 2005/0187935 A1 | 8/2005 | Kumar |
| 2005/0188353 A1 | 8/2005 | Hasson et al. |
| 2005/0216497 A1 | 9/2005 | Kruse et al. |
| 2005/0227216 A1 | 10/2005 | Gupta |
| 2005/0234969 A1* | 10/2005 | Mamou et al. ............... 707/102 |
| 2005/0240354 A1 | 10/2005 | Mamou et al. |
| 2005/0240652 A1 | 10/2005 | Crick |
| 2005/0243604 A1 | 11/2005 | Harken et al. |
| 2005/0256892 A1 | 11/2005 | Harken |
| 2005/0283473 A1 | 12/2005 | Rousso et al. |
| 2006/0004863 A1 | 1/2006 | Chan et al. |
| 2006/0015380 A1 | 1/2006 | Flinn et al. |
| 2006/0036522 A1 | 2/2006 | Perham |
| 2006/0047709 A1* | 3/2006 | Belin et al. ............... 707/201 |
| 2006/0063334 A1 | 3/2006 | Donze |
| 2006/0066257 A1 | 3/2006 | Chou |
| 2006/0074621 A1 | 4/2006 | Rachman |
| 2006/0074730 A1 | 4/2006 | Shukla et al. |
| 2006/0080177 A1 | 4/2006 | Walter et al. |
| 2006/0101011 A1 | 5/2006 | Lindsay et al. |
| 2006/0112109 A1 | 5/2006 | Chowdhary et al. |
| 2006/0123067 A1* | 6/2006 | Ghattu et al. ............... 707/203 |
| 2006/0167865 A1 | 7/2006 | Andrei |
| 2006/0174225 A1* | 8/2006 | Bennett et al. ............... 717/124 |
| 2006/0206869 A1 | 9/2006 | Lewis et al. |
| 2006/0212475 A1 | 9/2006 | Cheng |
| 2006/0218123 A1 | 9/2006 | Chowdhuri et al. |
| 2006/0228654 A1 | 10/2006 | Sanjar et al. |
| 2007/0061305 A1 | 3/2007 | Azizi |
| 2007/0078812 A1 | 4/2007 | Waingold et al. |
| 2007/0157191 A1 | 7/2007 | Seeger et al. |
| 2007/0169040 A1 | 7/2007 | Chen |
| 2007/0203893 A1 | 8/2007 | Krinsky et al. |
| 2007/0208721 A1 | 9/2007 | Zaman et al. |
| 2007/0214111 A1 | 9/2007 | Jin et al. |
| 2007/0214171 A1 | 9/2007 | Behnen et al. |
| 2007/0214176 A1 | 9/2007 | Rao et al. |
| 2007/0244876 A1 | 10/2007 | Jin et al. |
| 2007/0244976 A1 | 10/2007 | Carroll et al. |
| 2008/0001747 A1 | 1/2008 | Kangas |
| 2008/0092112 A1 | 4/2008 | Jin et al. |
| 2008/0127040 A1 | 5/2008 | Barcellona |
| 2008/0147703 A1 | 6/2008 | Behnen et al. |
| 2008/0147707 A1 | 6/2008 | Jin et al. |

(56) References Cited

U.S. PATENT DOCUMENTS

| | | |
|---|---|---|
| 2008/0168082 A1 | 7/2008 | Jin et al. |
| 2009/0322529 A1 | 12/2009 | Kangas |

OTHER PUBLICATIONS

U.S. Appl. No. 11/083,064, filed Nov. 3, 2005, Harken et al.
U.S. Appl. No. 11/372,516, filed Mar. 10, 2006, Rao et al.
U.S. Appl. No. 11/373,084, filed Mar. 10, 2006, Jin et al.
U.S. Appl. No. 11/373,685, filed Mar. 10, 2006, Behnen et al.
Ferguson et al., "Platform Independent Translations for a Compilable Ada Abstract Syntax", Feb. 1993 ACM 0-89791-621-2/93/0000-0312, pp. 312-322.
Ramu, Method for Initializing a Platform and Code Independent Library, IBM Technical Disclosure Bulletin vol. 37, No. 9, Sep. 1994, pp. 637-638.
Arkusinski et al., "A Software Port from a Standalone Communications Management Unit to an Integrated Platform", 2002, IEEE, pp. 1-9.
Zhao et al., "Automated Glue/Wrapper Code Generation in Integration of Distributed and Heterogeneous Software Components", Proceedings of the 8th IEEE International Enterprise Distributed Object Computing Conf. (EDOC 2004), 2004, IEEE, pp. 1-11.
Tjoa et al. (Eds.), "Data Warehousing and Knowledge Discovery—Data Mapper: An Operator for Expressing One-to-Many Data Transformations", Proceedings of 7th International Conference, DaWaK 2005, Copenhagen, Denmark, Aug. 22-26, 2005, 11 pages.
Jardim et al., "Integration and Adoptability of Aps: the Role of ISO TC184/SC4 Standards", International Journal of Computer Applications in Technology, vol. 18, Nos. 1-4, 2003, pp. 105-116.
Simitsis, "Mapping Conceptual to Logical Models for ETL Processes", ACM Digital Library, 2005, pp. 67-76.
Yu, "Transform Merging of ETL Data Flow Plan", INSPEC. AN-7576766, IKE '03 International Conference 2003, pp. 193-198.
Werner et al., "Just-in-sequence material supply a simulation based solution in electronics", INSPEC AN 7576766, Robotics and Computer-Integrated Manufacturing, vol. 19, No. 1-2, pp. 107-111, Feb.-Apr. 2003.
Vassiliadis et al., "A generic and customizable framework for the design of ETL scenarios", Information Systems, Databases: Creation, Management and Utilization, vol. 30, Issue 7, 2005, pp. 492-525.
Gurd et al., "The Manchester Prototype Dataflow Computer", Communications of the ACM, 1985, vol. 28, No. 1, pp. 34-52.
Stewart et al., "Dynamic Applications from the Group Up", Haskell'05 Sep. 30, 2005, Tallinn, Estonia, ACM, pp. 27-38.
Carreira et al., "Execution of Data Mappers", IQIS, 2004, pp. 2-9, 2004 ACM 1-58113-902-0/04/0006, Paris, France.
Friedrich, II, Meta-Data Version and Configuration Management in Multi-Vendor Environments, SIGMOD, Jun. 14-16, 2005, 6 pgs., Baltimore, MD.
Hernandez et al., "Clio: A schema mapping tool for information integration", IEEE Computer Society, 2005.
Haas et al., "Clio Grows Up: From Research Prototype to Industrial Tool", SIGMOD, Jun. 14-16, 2005, 6 pgs., Baltimore, MD.
Poess et al., "TPC-DS, Taking Decision Support Benchmarking to the Next Level", ACM SIGMOD, Jun. 4-6, 2002, 6 pgs., Madison, WI.
Rafaieh et al., "Query-based data warehousing tool", DOLAP, Nov. 8, 2002, 8 pgs., McLean, VA.
Carreira, et al., "Data Mapper: An Operator for Expressing One-To-Many Data Transformations," Data Warehousing and Knowledge Discovery, Tjoa, et al., editors, 7th International Conference DaWaK 2005 Copenhagen, Denmark, Aug. 22-26, 2005, pp. 136-145.
Method and Apparatus for Modelling Data Exchange in a Data Flow of an Extract, Transform, and Load (ETL) Process, U.S. Appl. No. 11/621,521, filed Jan. 9, 2007.
Konstantinides, et al., "The Khoros Software Development Environment for Image and Signal Processing," May 1994, IEEE, vol. 3, pp. 243-252.
Ives et al, An Adaptive Query Execution System for Data Integration, 1999 ACM SIGMOD International Conference on Management of Data, pp. 299-310.
Office Action History for U.S. Appl. No. 11/372,516.
Office Action History for U.S. Appl. No. 11/373,685.
Notice of Allowance dated Nov. 17, 2009 for U.S. Appl. No. 11/372,516.
Notice of Allowance dated Nov. 16, 2009 for U.S. Appl. No. 11/373,685.
Final Office Action dated Aug. 31, 2009 for U.S. Appl. No. 11/373,084.
Notice of Allowance for U.S. Appl. No. 11/548,659 dated May 13, 2011.
Final Office Action for U.S. Appl. No. 11/610,480 dated Apr. 13, 2011.
U.S. Patent Application entitled "Method and Apparatus for Adapting Application Front-Ends to Execute on Heterogeneous Device Platforms", filed Nov. 7, 2000.
Office Action History for U.S. Appl. No. 11/373,084.
Steweart et al., "Dynanmic Applications from the Group Up", Haskell '05 Sep. 30, 2005, Tallinn, Estonia, ACM, pp. 27-38.
M. Yang et al., "A high speed, high sensitivity silicon lateral trench photodetector", IEEE Electron Device Letters, vol. 23, p. 395-397, Aug. 7, 2002 <<http://ieeexplore.ieee.org/document/1015212/>>.
M. Yang et al., "High speed silicon lateral trench detector on SOI substrate", IEEE Electron Device Letters, p. 547-550, Aug. 7, 2002, <<http://ieeexplore.ieee.org/document/979565/>>.
Wald, Ingo, Phillip Slusallek, Casten Benthin, and Markus Wagner, "Interactive Rendering with Coherent Ray Tracing" Eurographics 2001, vol. 20, No. 3, pp. 1-12.
Rifaieh et al., "Query-based data warehousing tool", [Abstract Only], Nov. 8, 2002.

\* cited by examiner

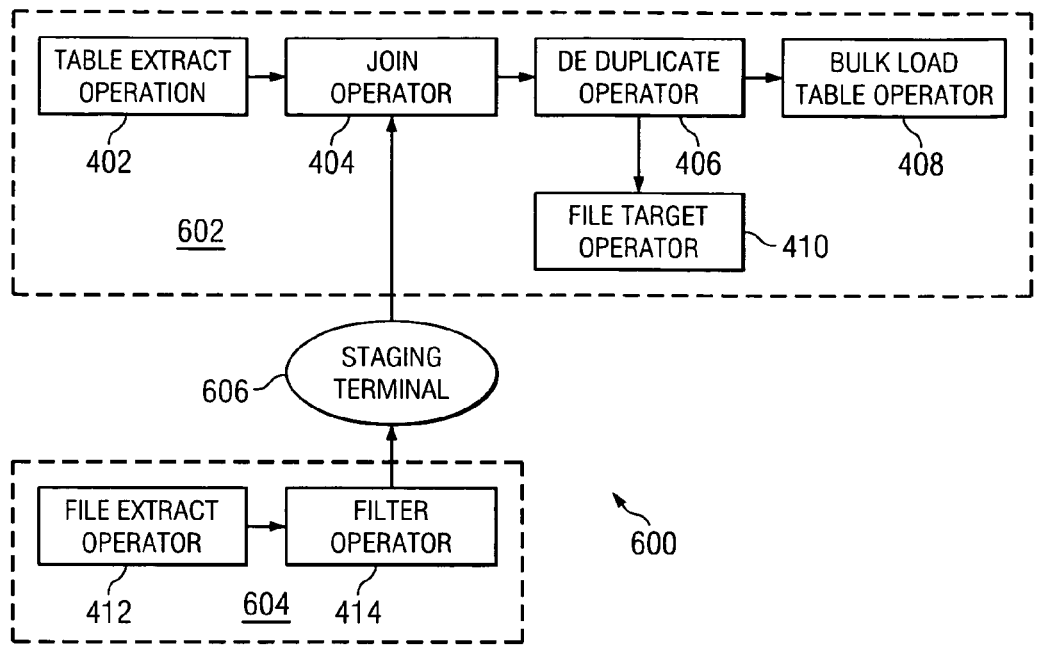
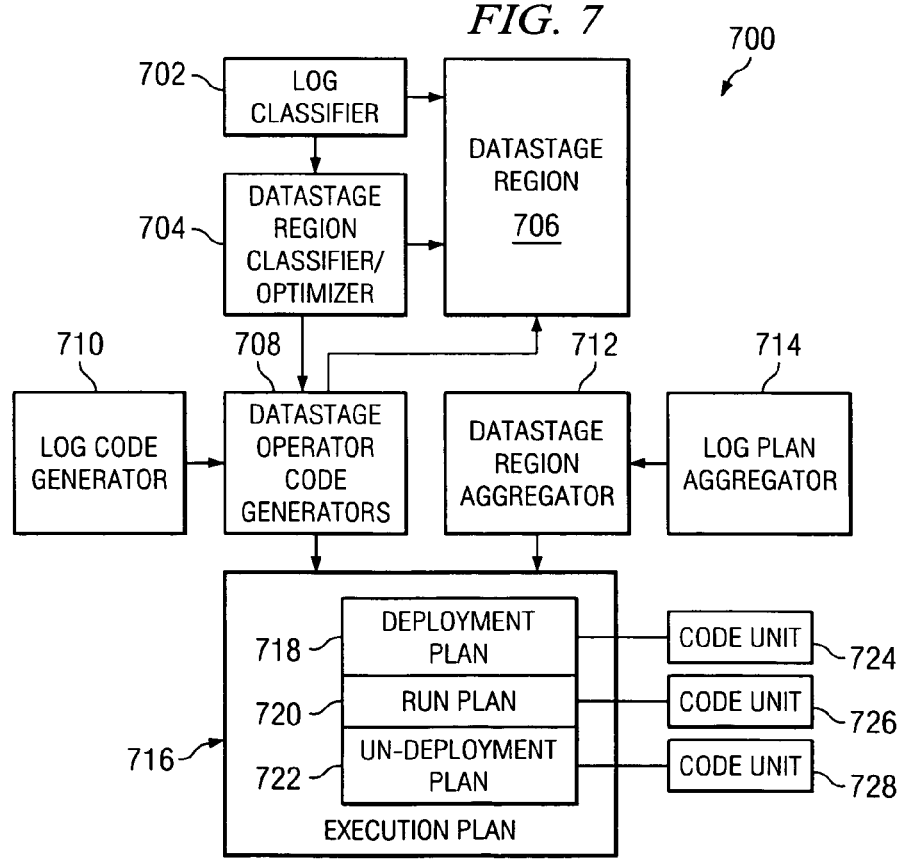

| REGION | TYPE | EXECUTION ORDER | OPERATORS |
|--------|------|-----------------|-----------|
| R1 | □ | 1 | 1 |
| R2 | ○ | 2 | 2, 3 |
| R3 | □ | 3 | 4 |
| R4 | ○ | 4 | 5, 7 |
| R5 | □ | 5 | 6, 8, 10 |
| R6 | ○ | 6 | 9 |

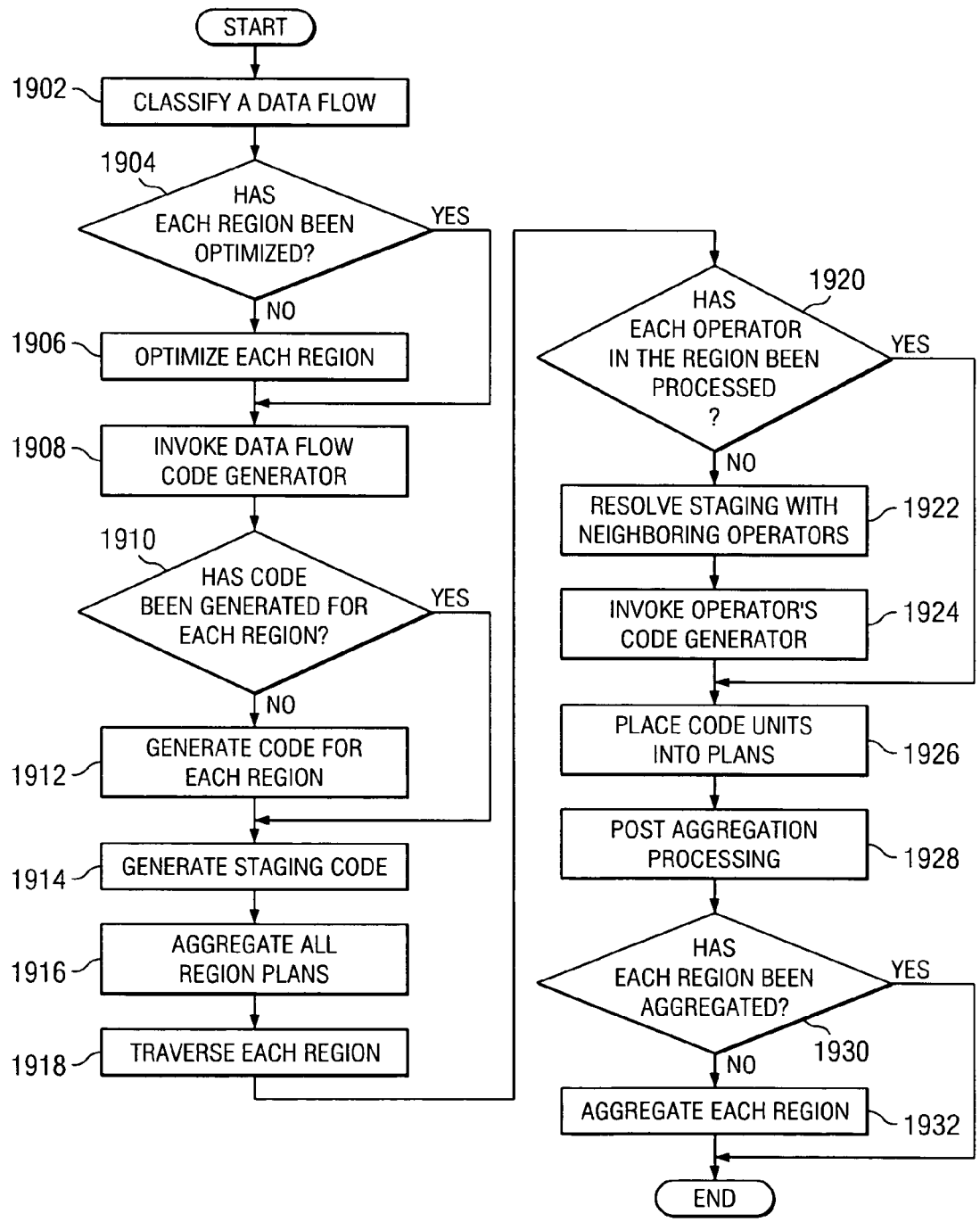

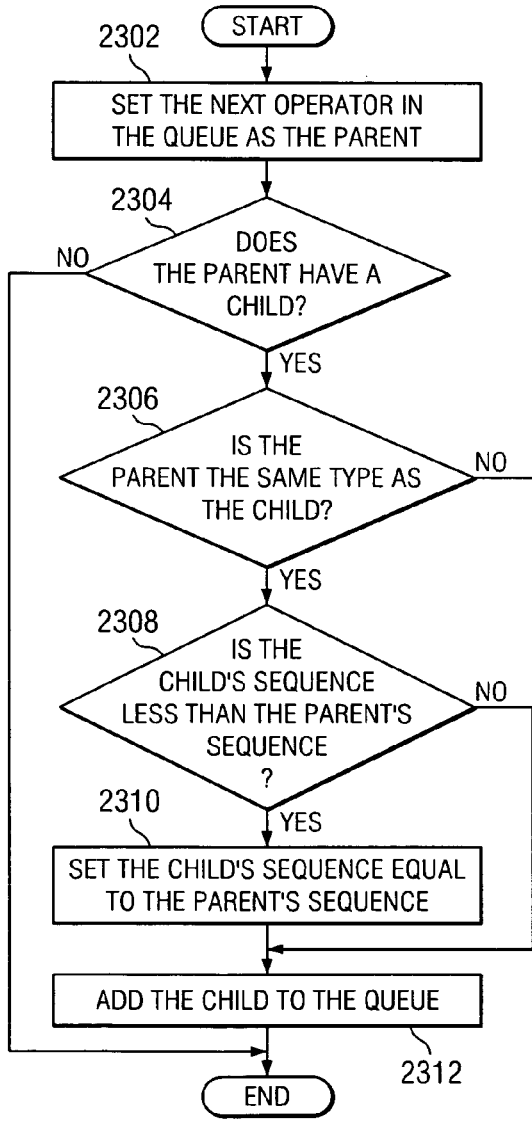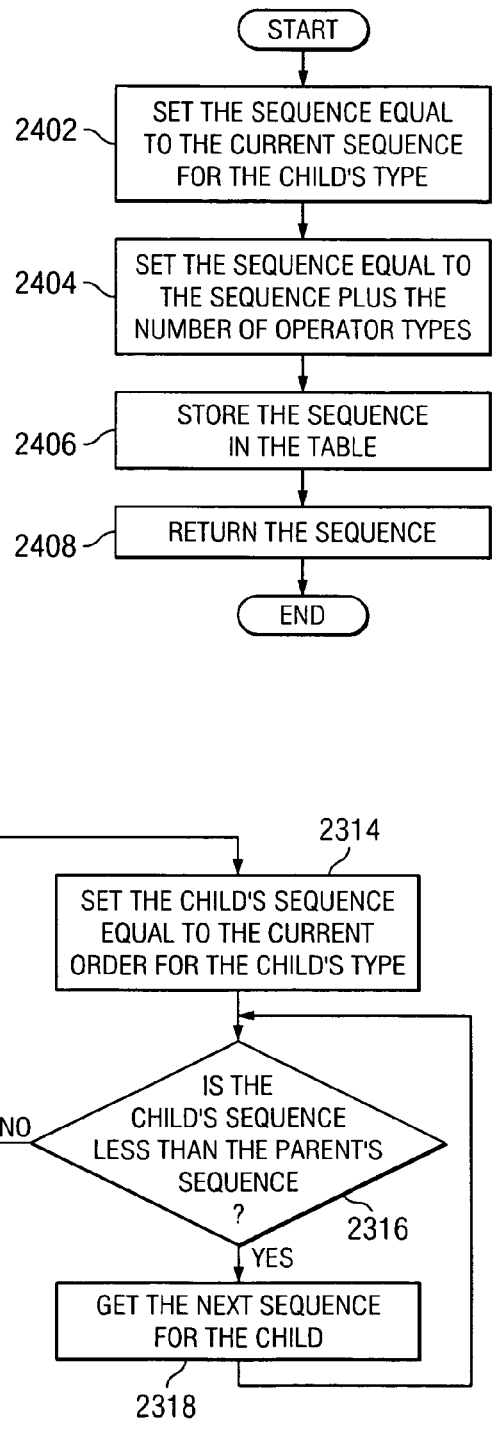

GENERATING CODE FOR AN INTEGRATED DATA SYSTEM

CROSS-REFERENCE TO RELATED APPLICATIONS

Embodiments of the invention are related to the following applications entitled "DILATION OF SUB-FLOW OPERATORS IN A DATA FLOW," Ser. No. 11/372,516, filed on Mar. 10, 2006; "CLASSIFICATION AND SEQUENCING OF MIXED DATA FLOWS", Ser. No. 11/373,084, filed on Mar. 10, 2006; and "DATA FLOW SYSTEM AND METHOD FOR HETEROGENEOUS DATA INTEGRATION ENVIRONMENTS", Ser. No. 11/373,685, filed on Mar. 10, 2006. All of the above related applications are assigned to the same assignee, and incorporated herein by reference.

BACKGROUND OF THE INVENTION

1. Field of the Invention

The present invention relates generally to data processing systems, and more particularly to a computer implemented method for integrating data flow in heterogeneous data environments.

2. Description of the Related Art

In enterprise application systems, consolidation of various data integration tools is inevitable due to frequent merges and acquisitions as normal business practices. Typical data integration applications are those types of applications in which data from multiple sources on varied data systems and repositories, need to be processed, combined, or otherwise transformed into data that is then loaded into multiple targets, again residing on different data systems and repositories. The best application performance may be achieved by making sure that the total data integration processing be broken down into smaller components of processing modules and ensuring that the appropriate runtime engine or runtime system is selected for the appropriate task.

For example, a database engine is the most appropriate engine for filtering rows of a relational table in a structured query language (SQL) database. Using the database engine is more efficient than pulling the data out of the database and into a text file, where the text file requires further filtering in order to insert the final data into another table in the same database. Structured query language (SQL) engines are specially optimized for such queries and tasks. In some cases, legacy data in text files or spreadsheets is best processed with by a specialized extract, transform, load (ETL) engine. Legacy data source is any file, database, or software asset (such as a web service or business application) that supplies or produces data and that has already been deployed.

However, the average user is not conversant with all types of processing engines and is unable to effectively choose an engine or other processing component easily. As a result, an enterprise needs to employ experts for each variety and variation of engines.

The problem is that there are different runtime systems that work very differently, use different protocols, and are generally incompatible. Such heterogeneous systems also have different development paradigms, no common developer language or even a uniform integrated development environment (IDE). In addition to these differences, new runtime systems are continually added to the enterprise. Currently, such complex data integration applications rely on users developing separate modules of applications for each runtime system and writing specialized code for each pair of runtime systems to bridge the gap between them. As a result, current data integration applications do not allow data processing engines to operate in a truly integrated fashion.

SUMMARY OF THE INVENTION

The aspects of the present invention provide a computer implemented method for generating code for an integrated data system. A mixed data flow is received. The mixed data flow contains mixed data flow operators, which are associated with multiple runtime environments. A graph is generated containing logical operators based on the mixed data flow in response to receiving the mixed data flow. The logical operators are independent of the plurality of runtime environments. The graph is converted to a model. The logical operators are converted to model operators associated with the multiple runtime environments. The model operators allow for analysis of operations for the mixed data flow. The model is converted into an execution plan graph. The execution plan graph is executable on different runtime environments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is the data flow of FIG. 4 divided by region in a heterogeneous data integration system in accordance with an illustrative embodiment of the present invention.

FIG. 7 is a flow diagram illustrating a region processing framework for a data integration system in accordance with an illustrative embodiment of the present invention;

FIG. 19 is a flowchart illustrating data flow code generation in accordance with an illustrative embodiment of the present invention;

FIG. 23 is a flowchart illustrating operator sequencing in accordance with an illustrative embodiment of the present invention;

FIG. 24 is a flowchart illustrating receiving the next sequence for an operator in accordance with an illustrative embodiment of the present invention.

DETAILED DESCRIPTION OF THE PREFERRED EMBODIMENT

Figure 1:
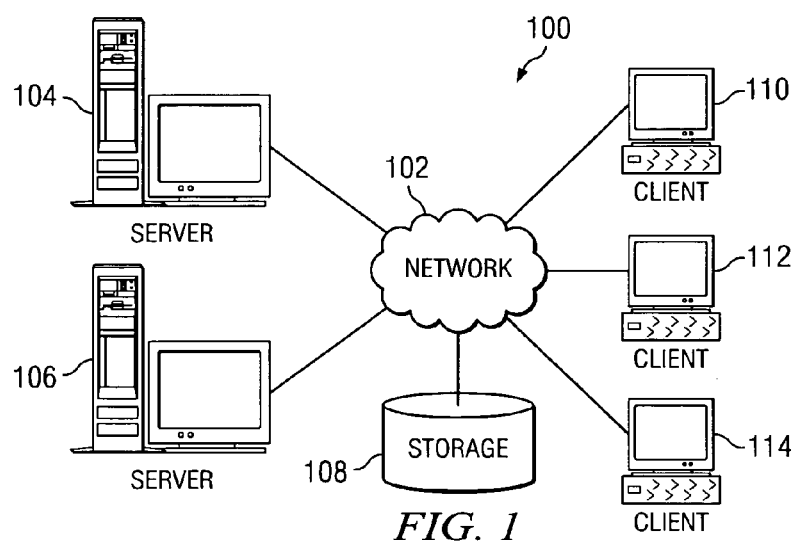
FIG. 1 is a pictorial representation of a data processing system in which the aspects of the present invention may be implemented.
Figure 2:
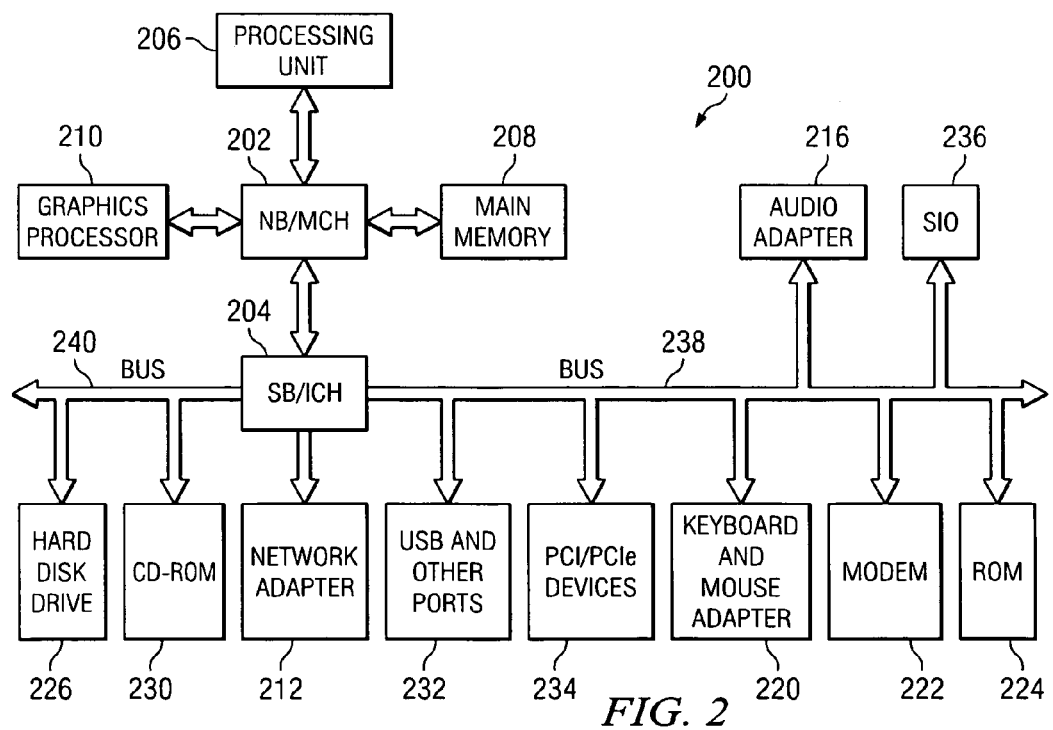
FIG. 2 is a block diagram of a data processing system in which aspects of the present invention may be implemented.

With reference now to the figures and in particular with reference to FIGS. 1-2, exemplary diagrams of data processing environments are provided in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pseries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for embodiments of the present invention are performed by processing unit 206 using computer usable program code, which may be located in a memory such as, for example, main memory 208, ROM 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course, the bus system may be implemented using any type of communication fabric or architecture that provides for a transfer of data between different components or devices attached to the fabric or architecture. A communication unit may include one or more devices used to transmit and receive data, such as modem 222 or network adapter 212 of FIG. 2. A memory may be, for example, main memory 208, ROM 224, or a cache such as found in NB/MCH 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Aspects of the present invention provide a computer implemented method, apparatus and computer usable program code for integrating data flow in heterogeneous data environments. Embodiments of the present invention provide an architecture and system that enables users to model logical flows for higher level operations, or data flows, which are then processed. A data flow represents a logical transformation and flow of data. The processing results in the generation of code units organized inside an execution plan, capable of running on different runtime systems in proper sequence and with automatic data exchange between the different runtime systems. The runtime system includes the operating system, runtime or execution engine, and other software used to execute the execution plan as is referred to generically as the runtime engine. An execution plan engine may be used to execute the execution plan graph and may invoke various runtime engines to run queries or jobs as needed. The execution plan or execution plan graph is an ordered sequence of code units generated based on the original data flow received from the user from other formats which may include a logical operator graph and extended query graph model.

The execution plan also contains instructions to organize the code units into transactional contexts as well. Each such transactional context is associated with the individual runtime engine resource. For example, a relational database management system such as DB2 or a DataStage extract, transform, load (ETL) engine.

A runtime system or runtime engine is a program that performs a core or essential function for other programs. An engine can be a central or focal program in an operating system, subsystem, or application that coordinates the overall operation of a coordinated set of programs. Runtime engine is also used to describe a special-purpose program containing an algorithm that can sometimes be changed or a function that performs all of the database access required by an application program while it is executing.

The data integration system also generates code to bridge or transform, data from a format used by one runtime engine domain to a format used by another runtime engine domain. For example, generating a temporary file or database table that can be used to exchange data from one engine to another.

The data integration system allows for customized code generation for exchanges between two known engines. For example, since a DataStage extract, transform, load (ETL) engine is capable of accessing DB2 database tables, the data integration system would instead generate code to exchange data inside structured query language (SQL) views or structured query language tables rather than files. In other cases, depending on how the exchanged data is used, files may still be used for better performance. For example, if a DataStage system needs data in a file, then it may be better for performance for a previous runtime engine to provide the data in the file at termination, rather than in a table. By providing the file in this manner, the system avoids having the DataStage system extract data from the table to the file and only then continuing the runtime processing.

The data integration system also permits adding different runtime engines as well as a means of describing different operations suited for those runtime engines. A mechanism also exists to describe what type of staging, such as files, permanent tables, views, and queues, are acceptable and which are preferable for each kind of operation. This allows the code generator to pick and choose staging mechanisms that best suit the situation.

In the illustrative examples, the data integration system provides the ability to generate an internal transformation graph model that is extensible to support new operators, the ability to generate appropriate execution code modules and data interchange code modules to be able to execute a transformation job across multiple runtime engines, and the ability to generate code modules for different runtime engines from the same internal representation. For example, a data flow may be compiled into strict structured query language or into a strict DataStage job or any other type of job by plugging in the appropriate code generator.

Figure 3:
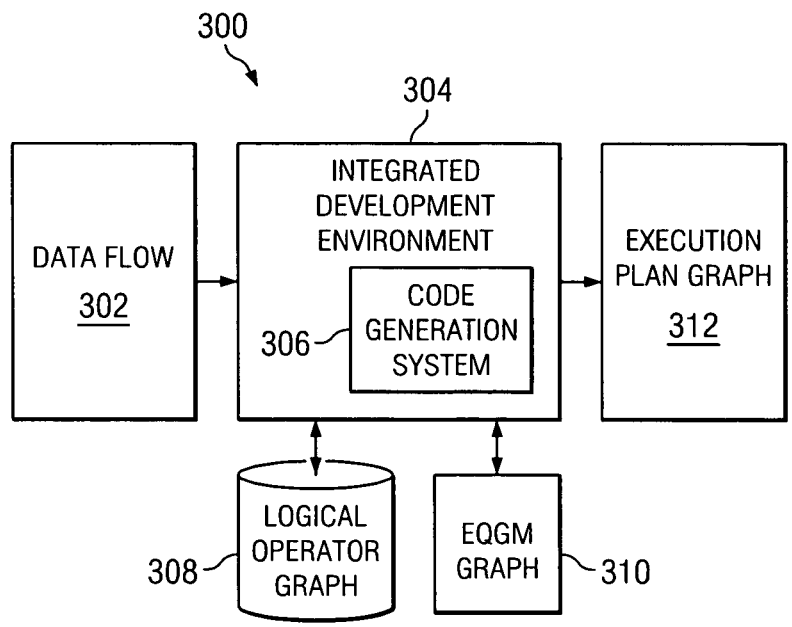
FIG. 3 is a block diagram of a data integration system in accordance with an illustrative embodiment of the present invention.

FIG. 3 is a block diagram of a data integration system in accordance with an illustrative embodiment of the present invention. Data integration system 300 of FIG. 3 is a system that may be implemented by a data processing system such as client 110 or server 104 of FIG. 1. Data flows are special data structures managed in data integration system. Data flow 302 is built based on user input and may be created using a data flow user interface tool. For example, versions of the IBM DB2 Data Warehouse Edition (DWE) product have a data flow graphical editor that allows users to build data flows. Such user interfaces allows users to draw operator nodes and interconnect them with links to indicate a specific semantic instance of data transformation sequence.

Integrated development environment 304 is a software component that assists computer programmers in developing, creating, editing, and managing code for target platforms. Integrated development environment 304 may also contain code generation system 306.

Logical operator graph (LOG) 308 is a normalized, minimalist representation of the user's data flow, made easier for code generation manipulations. The term 'logical' indicates that the graph does not have any physical aspects, such as data storage, presentation, or otherwise. Logical operator graph 308 is simply a logical abstract collection of operator nodes. Frequently a data flow data structure has other information, not pertinent to its processing. For example, the positions of borders for visual presentations. Logical operator graph 308 is only that specific portion of a complete data flow 302 that contains the pertinent data transform information. In some implementations, data flow 302 does not have any un-necessary information, and all of data flow's contents need to be used as-is, in which case logical operator graph 308 is the same as data flow 302. As a result, the terms logical operator graph 308 and data flow 302 may be used interchangeably. Logical operator graph 308 is sent to code generation system 306.

Code generation system 306 converts logical operator graph 308 into extended query graph model (EQGM) 310. Extended query graph model 310 is an internal data model used for analysis. This analysis also may include optimization processes. Extended query graph model 310 is analyzed to apply codegen optimization such as chunking and execution parallelism. Chunking is the process of breaking one subset of data flow 302 into multiple pieces which yields optimal performance. Execution parallelism refers to the code generation process that groups disparate set of operations within data flow 302 and executes them in parallel to yield optimal performance. After analysis, extended query graph model 310 is converted into execution plan graph 312 by code generation system 306. Execution plan graph 312 is sent to the runtime systems for execution.

A graph like data structure, such as logical operator graph 308, is commonly used to model the sequence of operations in typical data processing activities. Each node in this graph represents a single logical step in the entire process. A link is used to interconnect nodes in the logical operator graph.

The logical operator graph 308 is composed of nodes, interconnected by links. Each node or 'operator' has specific semantics and property values, which indicate the specific type of data processing operation to be performed.

Operators have a set of 0 to n inputs referred to as input ports. Operators also have a set of 0 to n outputs referred to as output ports. Depending on the semantics of the operation, an operator may allow the addition of ports during the design and manipulation of the graph.

Operators have a set of properties. The property values are manipulated by the graph instance designer to govern the parameters of the particular operation. These operator properties may be of different 'data types', for example, integers, lists, strings, expressions, database tables, and files. Different types of properties may be introduced into the data integration system.

Links interconnect different operator instances. For example, data described by a virtual table, exits from one operator's output port and enters into another operator's input port. There may be multiple links exiting one output port, however, one input port may accept only one incoming link. If an operator requires two incoming links, then two input ports may be defined. Links may also have properties to explicitly identify the semantics of the interconnection between two operator instances in logical operator graph 308.

Ports may also have defined properties. Port properties link the port to a specific data type. As a result, port properties are used to provide additional operational parameters in context to the specific input or output.

Each type of operation that needs to be performed by the system is described by an operator definition. An operator definition is a specification or special meta-data structure managed in the data integration system. The operator definition may be represented and introduced into the data integration system in various ways. The operator definition serves as a means to extend the system, since operator definitions may be added to introduce new functionality into the system. Regions are also identified by region definitions, which are very similar to operator definition. Different regions may also be introduced into data integration system 300 whenever new runtime engines need to be supported.

The operator definition includes a name that uniquely identifies its functionality and the runtime engines that support this function. The operator definition also includes a set of input ports and output ports. If the operator includes input ports or output ports, each port is uniquely named and each port is associated ordered according to staging preferences. For example, the input or output ports may be preferentially ordered temporary table, persistent table, queue, flat file, and extensible mark-up language (XML) file.

The operator definition also includes a set of properties that may be set by the user to customize the functionality of this operation, and an operator specific code generator module that conforms to the system's code generation engine interface. The system's logical operator graph level code generator invokes this operator specific code generator whenever an instance of this operator type is encountered. An operator definition may have a different code generator for each type of region present and generate code dependent on the region to which an operator instance is categorized. Similarly, the same code generator module may instead programmatically determine the operator's region and suitably generate region-specific code. For example, a File Import operator may be classified into a structured query language region or into a DataStage region, depending on the classifier's optimization criteria. For a File Import in a structured query language region, structured query language queries or a Load/Import statement, may be generated by the code generator. If however, the File Import operator has been placed into a 'DataStage' region, then the code generator may instead generate data stage parallel job code instead. As a result, when a new operator definition is introduced into data integration system 300, the extender of the system may then decide to also support all or some of the currently-existing regions by specifying which regions this operator may be supported under. Similarly, whenever a new runtime engine is added, a new region 'type' is introduced into the system. At this time, the extender of this system may decide to alter certain operator definitions to be supportable in this region or add new operator definitions specific to that region.

Execution plan graph 312 is an ordered sequence of code units that are produced by code generation system 306. Each code unit represents a particular unit of work and is associated with a specific runtime engine by the code type used. Additionally, each code unit has associated attributes and resource references. For example, code units of type 'Java' are associated with the 'Java virtual machine' runtime engine. Each Java code type also has an associated attribute called 'Class name' to indicate the object to be instantiated and executed as well as other attributes and values used as runtime arguments to the instantiated object. Other code types may include 'Executable' to indicate that an executable needs to be executed. A code unit of type 'SQL' is, associated with a database engine resource, and contains structured query language code to be executed against the database engine. A code unit of type 'DataStage Job' indicates that a DataStage job is to be executed, and the code unit, contains the DataStage engine resource reference as an attribute.

Code units are grouped into different transaction blocks. Transaction blocks are used to represent that all code units in that block need to succeed for a 'commit'. On a first failure the entire block is 'rolled back'. All the resources, including data base engines for example, used in this block are part of the transactional context. In situations, where transactions are not naturally supported, blocks contain 'catch' or 'undo' code units that may be executed to undo the effects of an original code unit to simulate the rollback of a transaction. For example, executable code types may be rolled back as needed.

The data integration system execution plan engine, also known as the data integration system-runtime engine, is used to process execution plan graph 312. This execution engine may process the execution plan graph in a sequence. For example, for each transaction block, the execution engine identifies the resources in the execution plan graph. The execution engine may connect and begin transactions to database or other runtime environments and initiate a two phase commit, if supported. Two-phase-commit is a standard transactional protocol and is a distributed algorithm which lets all nodes in a distributed system agree to commit a transaction. The protocol results in either all nodes committing the transaction or all aborting, even in the case of network failures or node failures. Following such a protocol offers better error recovery. For example, jobs are never left only partly completed with parts of the data not being updated. Either jobs are completely done or they are rolled back to a consistent state. Since two-phase-commit is a standard technique, many vendors offer support for it.

For each code unit, the runtime engine identifies the code type and resource references. Each code unit is executed according to the code type. For example, for a structured query language code unit, the runtime engine executes the structured query language code associated with the code unit using the database engine resource, database connection, and transactional context made at the beginning of the transaction block.

On a failure, the execution engine executes the 'catch'/'undo' code units of the execution plan graph in order to rollback all transactions started. On a successful execution of all the code units, the execution engine commits the transactions. Transaction commit implies that all the changes are made permanent. A transaction rollback or equivalent execution of catch/undo code, implies that all changes currently made will be undone and the system moves back to a consistent or safe state.

Figure 4:
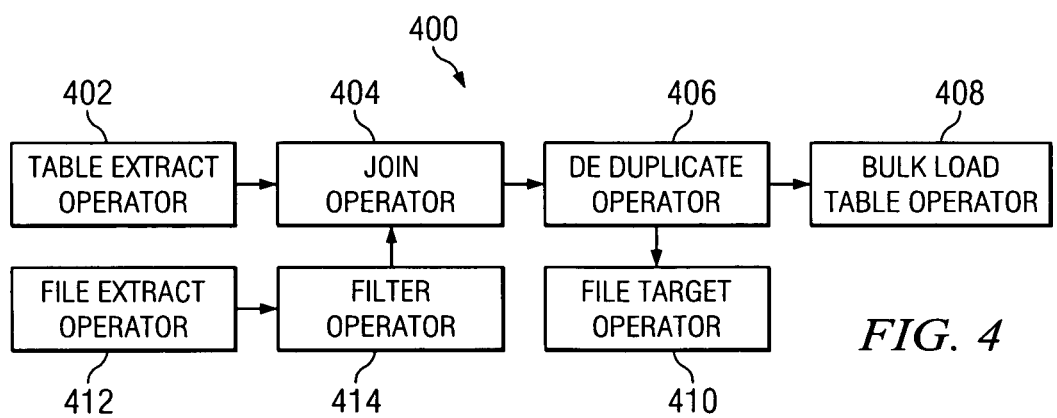
FIG. 4 is an exemplary data flow in a heterogeneous data integration system in accordance with an illustrative embodiment of the present invention.

FIG. 4 is an exemplary data flow in a heterogeneous data integration system in accordance with an illustrative embodiment of the present invention. Data flow 400 may be a data flow such as data flow 302 of FIG. 3. Data flow 400 is a specialized logical operator graph used to indicate a specific instance of data transformation sequence and semantics. Data flow 400 uses virtual tables and a collection of virtual columns to describe the structure of data moving through links, from one operator to another. Virtual columns are similar in concept to structured query language relational columns including a data type, precision, and length as appropriate. Virtual tables are similar in concept with structured query language relational tables; however, because this is a logical model, no structured query language or physical storage modeling is imposed, unless decided later by the code generation engine. The virtual tables indicate a form of inter-operator semantics.

Data flow 400 may include various operators representing operations such as structured query language operations and ETL DataStage operations. Consider that Table extract operator 402, join operator 404, de-duplicate operator 406, bulk load table operator 408, and file target operator 410 are all structured query language engine operators. File extract operator 412 and filter operator 414 are examples of ETL DataStage operators. There are multiple ways of identifying which region a particular operation is to be placed in. In one illustrative embodiment, the specific region is explicitly identified by the operator's definition. In a second embodiment, the operator definition specifies a different operator-specific code generator for each region type, in the operator definition. Hence the code generated for this operator would be different depending on which region it is placed under. The classifier may then decide which region is best suited, as part of the optimization process, for this particular operation.

Each type of operation that needs to be performed by the system is described by an operator definition. The operator definition describes the operator in detail, includes semantics, inputs, outputs, as well as staging preferences. In FIG. 4, each operation in data flow 400 includes an input port with an incoming arrow and an output port with an outgoing arrow. For example, join operator 404 includes two input ports and has only a single output port whereas the de-duplicate operator 406 has two output ports with only a single input port.

In this example, file extract operator 412 may access a text file for sales. File extract operator 412 outputs information to filter operator 414. Filter operator 414 may filter the text file to output only orders that were made on February 14$^{th}$ of the current year. The filtered data is output to join operator 404.

Table extract operator 402 may have reference to a 'sales' database from which data is to be extracted as output to join operator 404. Data extracted from the structured query language table may be joined with data from a file filtered by DataStage in join operator 404 with a 'join condition' by setting the join operator's property say, matching by 'order number'. The output from join operator 404 is input into de-duplicate operator 406. De-duplicate operator 406 is an operator or node with multiple output ports. For example, distinct data is output by de-duplicate operator 406 and is loaded onto a target table by bulk load table operator 408 and duplicate data is saved into a file by file target operator 410.

Figure 5:
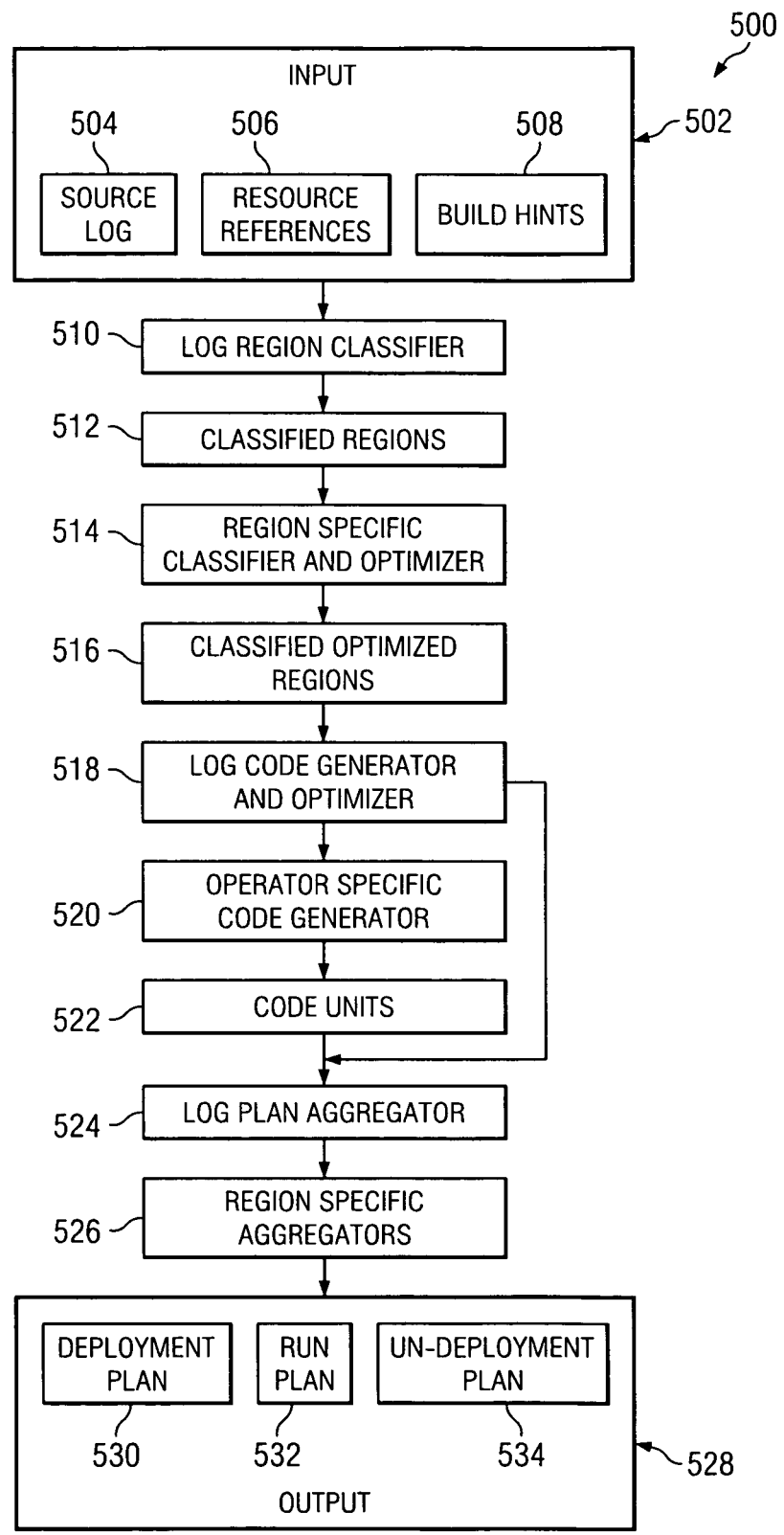
FIG. 5 is a flow diagram illustrating a processing framework for a data integration system in accordance with an illustrative embodiment of the present invention.

FIG. 5 is a flow diagram illustrating a processing framework for a data integration system in accordance with an illustrative embodiment of the present invention. Data processing framework 500 of FIG. 5 may be implemented in a data integration system such as data integration system 300 of FIG. 3. Input 502 may be a data flow submitted by a user. Data flows input may further be pre-processed and pertinent transformation sequence information extracted as a logical operator graph model. Input 502 may include source logical operator graph (LOG) 504, resource references 506, and build hints 508.

Source logical operator graph 504, which may also be a data flow, is the data structure that is built by the user in the form of a flow, indicating a desired transformation sequence. For executing such data flows, the user also needs to introduce into the system, the various resources available. For example, there could be structured query language resources, such as the IBM DB2 database engine, the IBM Informix database engine, or an external extract transform engine such as the Websphere DataStage engine, as well as other resources such as "machines". Each such resource reference 506, includes information regarding each runtime engine, which may include version, compatibilities, and necessary libraries. Operators may have references to these resources.

For example, a 'Table Source' operator may need to indicate that the structured query language table exists in a particular database and so the database resource reference associated is associated with the operator's properties. Build hints 508 are hints used by the code generator for generating code based on input 502. For example, in one example build hints 508 includes flags used during code generation.

Some of build hints 508 include a 'debug' flag or an 'optimize' flag. The users, prior to invoking the code generation option, may set the flags to tune the operation of the code generators. For example, 'debug' may cause certain code generators to generate code that has debugging or trace statements for easy diagnostics. In one example, source LOG 504 may be an in-memory object saved as an extensible markup language (XML) file. Representing the data flow and logical operator graph as an extensible markup language file provides maximum portability and provides a potentially standard way of import/exporting flows and for easily enabling different user interface tools or scripting languages for building the source data flow. Source logical operator graph allows users to update properties and in general model the flow of operations that a user needs performed. In-memory objects, such as source LOG 504, are typically saved for later edits. The handling of different operator types, semantics and exact storage of source LOG 504 is implementation dependent.

Input 502 is passed to LOG region classifier 510. LOG region classifier 510 groups sequences of operator instances into individual regions. Each region, or smaller separated data flow, corresponds to a runtime engine capable of supporting all of the operations in the region in sequence. New region types may be added to the system, by an extender. Each region has a 'region type' to indicate the applicable type of runtime engine. Each region has a definition similar to the operator definition, in which additional properties may be specified as needed, as well as Region-specific aggregator modules. For example, region types may include a 'structured query language' region type as well as 'DataStage' region type and the region properties may be used by different code generators for each region. Whenever one operator instance in a region is connected by a link to another operator in a different region, this link is termed as an inter-region link or staging terminal and serves to identify situations that may need data staging. One advantage of grouping operator instances is that runtime engine specific optimizations are possible. LOG region classifier 510 is also responsible for ordering the runtime engine execution code. LOG region classifier 510 creates an individual execution plan corresponding to each region and lays each execution plan out in sequence. The code generators are then able to add on code units to the corresponding region's execution plan.

LOG region classifier 510 creates classified regions 512. Classified regions 512 include the operators as categorized and include staging terminals. Staging terminals tell how each region is connected and ensures that operators remain in the proper order. Classified regions 512 are passed to region specific classifier and optimizer 514. Region specific classifier and optimizer 514 typically perform, merge, split, and reorganization operations. Region specific classifier and optimizer 514 also ensures that data types are compatible with the staging code. In an illustrative embodiment, environment specific optimizations are performed for each runtime region. Optimization decisions may be made by custom region specific optimizer modules developed by extenders of this system. The creation of modules may be especially useful for newer runtime engines. For example, a structured query language region code generator may combine a sequence of database table extract operations and a filter operation into a single structured query language code unit with a SELECT and WHERE clause.

Region specific classifier and optimizer 514 outputs classified optimized regions 516. Each classified optimized region 516 is represented by a smaller logical operator graph. The smaller logical operator graph is the same data structure that is used to represent the original monolithic non-classified flow. Each classified optimized region 516 is processed by LOG code generator and optimizer 518 which traverses that region's logical operator graph in sequence of operations and invokes each operator's code generator. The code generated by LOG code generator and optimizer 518 is placed in order into the execution plan.

For each link inside the regions, the LOG code generator and optimizer 518 checks if there needs to be staging between the upstream operation and the down stream one. For example, if the output port indicates that it may produce files and the input port indicates that it may consume files, no staging is required. However, if the down stream operator expects a persistent database table, then LOG code generator and optimizer 518 generates code that loads the file into a suitable database table. The columns in the generated database table conform to the columns of the input port's virtual table.

LOG code generator and optimizer 518 ensures that for every inter-region link, additional code is generated to perform data staging if needed. The additional code ensures that interconnected regions pass data in the correct format as expected by the operators in each region. Additional code is generated dependent on whether the input and output ports of the link have compatible staging specifications.

During the processing of each region's logical operator graph by LOG code generator and optimizer 518, operator specific code generators 520 generates code units 522 for operators in each region. Code units 522 are specific for each type of plan and tell the execution plan which runtime engine resource is used to execute each operator. For example, given two structured query language code units, one to be executed against resource 'database A' and another to be executed against resource 'database B', it may be entirely possible that both these code units exist in the same structured query language region. The execution plan is a collection of the code units in a specified order.

LOG plan aggregator 524, builds the final execution plan by merging, in sequence, all the transaction blocks and code units 522 from the different region specific execution plans, interspersed by the inter-region staging code, if any. Region specific aggregators 526 are used to aggregate code units 522 or other structures into the final execution plan. For example, with a DataStage region, a region specific aggregator within region specific aggregators 526 chains together code units 522 to form a DataStage parallel job. A DataStage parallel job is extensible markup language text that represents and describes the work to be done in a DataStage engine. The execution plan contains a reference to this generated parallel job's identification.

Apart from the runtime execution code placed in runtime execution plan 532, code generators may also generate output 528 including 'deployment' and 'un-deployment' code placed in corresponding execution plans in deployment plan 530 and un-deployment plan 534 respectively. Deployment plan 530 is used to prepare different runtime engines for production time execution. For example, to create once-only tables and stored procedures in structured query language engines that are needed later on for regularly scheduled executions. Un-deployment plan 534 is used to undo or clear the effects of executing deployment plan 530. Run plan 532 includes the execution plan that may be run multiple times based on the user's requirements. The run plan is typically called the 'data transformation job' that is usually scheduled for day-to-day operations.

FIG. 6 is the data flow of FIG. 4 divided by region in a heterogeneous data integration system in accordance with an illustrative embodiment of the present invention. Data flow 600 is the data flow 400 and operations of FIG. 4 divided by region. In this example, data flow 600 is divided into two regions based on two different runtime engines.

Structured query language region 602 includes multiple operators for a data base engine such as structured query language runtime engine. DataStage region 604 includes operators for a DataStage engine. Structured query language region 602 and DataStage region 604 are interconnected by staging terminal 606. Staging terminal 606 ensures that data passed from the output port of the filter operator 414 in DataStage region 604 is understood as received by the input port of join operator 404 in structured query language region 602.

In one example, filter operator 414 in DataStage Region 604 outputs a file to staging terminal 606. Staging terminal 606 converts the file into a temporary table more easily understood by the structured query language engine of structured query language region 602. The temporary table is output by staging terminal 606 to the input port of join operator 404 of structured query language region 602. As a result, the different operators of each region are able to communicate according to staging preferences. The staging choices may be prioritized preferences for inter operator interfaces as established by an operator designer, listed in priority order in an operator's definition. For example, an operator may prefer to receive input in a table, file, queue, or other format specified in the interfacing preferences.

FIG. 7 is a flow diagram illustrating a region processing framework for a data integration system in accordance with an illustrative embodiment of the present invention. The region specific data processing framework 700 of FIG. 7 is an example of how specialized region processing occurs may be implemented in a data processing framework such as data processing framework 500 of FIG. 5. FIG. 7 uses the example of a 'DataStage' region to show how a region's processing is invoked by the generic LOG classifier, LOG code generator and LOG plan aggregator components. LOG classifier 702 invokes DataStage region classifer/optimizer 704 using DataStage region 706 including staging terminals as input. DataStage operator code generators 708 are invoked by LOG code generator 710. DataStage operator code generators 708 outputs information to DataStage region aggregator 712. LOG plan aggregator 714 inputs execution plans into DataStage region aggregator 712. DataStage region aggregator 712 outputs execution plan 716 which may include various elements including deployment plan 718, run plan 720, and un-deployment plan 722.

Deployment plan 718 includes a reference to code unit 724. Code unit 724 is a DataStage parallel job 716 which is in an extensible mark-up language (XML) format and includes unique job identification. The extensible mark-up language file of code unit 724 indicates that this parallel job is to be deployed into the target DataStage runtime engine. Run plan 720, has a reference to code unit 726 and the same Datastage job identifier as code unit 724. Code unit 726 and the associated job identifier indicates that during execution, code unit 726 needs to execute that specific job, in the target DataStage engine. Un-deployment plan 722 includes code unit 728 and also has a reference to the same Datastage job identifier of code units 724 and 726 and indicates that during un-install, the Datastage job must be un-deployed/deleted from that DataStage engine.

For example, the job identification may be 665 to be executed by DataStage engine 'D1'. Code unit 724 would have the reference 'D1' as well as a reference to the XML file describing the DataStage job with job identification 665. Code unit 726 and code unit 728 would have the reference to the DataStage engine 'D1' as well as the job '665'.

Figure 8:
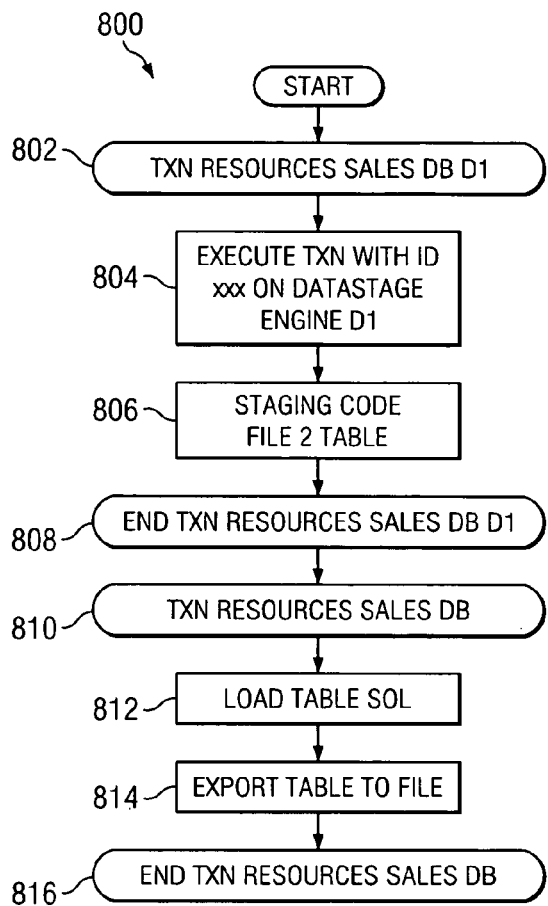
FIG. 8 is an exemplary execution plan for the data flow of FIG. 6 for a data integration system in accordance with an illustrative embodiment of the present invention.

FIG. 8 is an exemplary execution plan for the data flow 600 of FIG. 6 for a data integration system in accordance with an illustrative embodiment of the present invention. Execution plan 800 may be executed by any number of runtime engines. In this example, the execution plan is directed toward data flow 400 of FIG. 4 and data flow 600 of FIG. 6. Various steps in FIG. 6 are directed toward file extract operator 412, filter operator 414, table extract operator 402, join operator 404, de duplicate operator 406, bulk load table operator 408 and file target operator 410 of FIG. 4 respectively. Clear delineation of steps in execution plan 800 may not directly translate to operators because during processing operations may be merged or split into multiple operations.

Execution plan 800 is sequentially ordered into two integrated transactions. The DataStage transaction begins (step 802). Next, the DataStage engine executes the specific DataStage job (step 804), in the context of the DataStage transaction started in step 802. Step 802 and step 804 of execution plan 800 correspond to DataStage region 604 of FIG. 6 which includes file extract operator 412 and filter operator 414 from FIG. 6. Next, the DataStage operator physically implementing the staging terminal converts the file to a table (step 806). Next, the DataStage transaction ends (step 808).

Next, the structured query language (SQL) transaction begins (step 810). The structured query language engine executes a query (step 812). The query of step 812 corresponds to structured query language region 602 which includes table extract operator 402, join operator 404, de duplicate operator 406 of FIG. 6. The result of the query of step 812 corresponds to the bulk load operator 408 of FIG. 6. Next, the structured query language engine executes another query (step 814). The query of step 816 corresponds to file target operator 410 of FIG. 6. The structured query language engine executes another query (step 816) which involves finally committing the structured query language transaction of execution plan 800. The entire structured query language transaction is completed after the completion of step 816.

Figure 9:
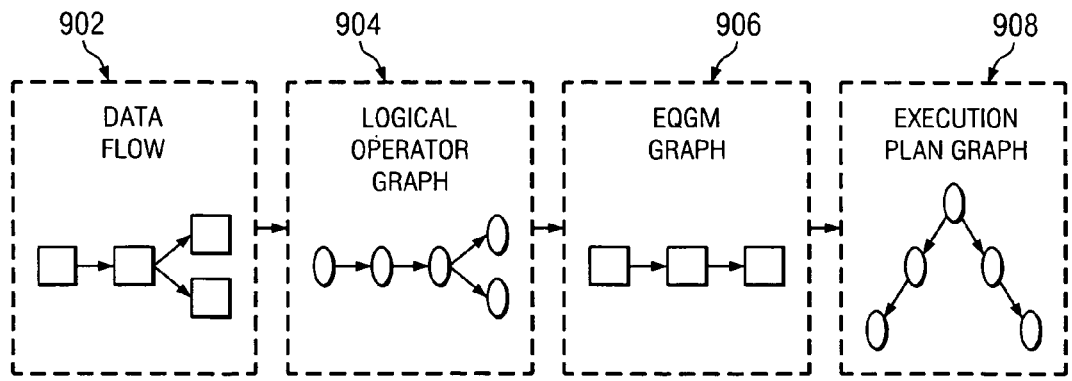
FIG. 9 is a flow diagram illustrating code generation in accordance with an illustrative embodiment of the present invention.

FIG. 9 is a flow diagram illustrating code generation in accordance with an illustrative embodiment of the present invention. FIG. 9 may be implemented in a data integration system such as data integration system 300 of FIG. 3. Data flow 902 is user input and may be received by a code generation system such as code generation system 306 of FIG. 3. The code generation system converts data flow 902 into logical operator graph 904.

Logical operator graph 904 is converted into extended query graph model 906, an internal data model used for analysis. As mentioned before, the analysis may include optimizations. After analysis, extended query graph model 906 is converted into execution plan graph 908.

Various runtime engines may be used to execute execution plan graph 908. Data extract, transform, and load (ETL) engines are one commonly used form of engine. Various ETL engines are used for different applications based on criteria such as functional use and vendor preferences. For example, some ETL engines process ETL operations through structured query language and structured query language procedural language (SQL/PL). SQL/PL is a language extension of SQL that consists of statements and language elements that can be used to implement procedural logic in SQL statements. SQL/PL provides statements for declaring variables and condition handlers, assigning values to variables, and for implementing procedural logic. Other ETL engines use their proprietary ETL engines to process operations. Logical operators within data flow 902, logical operator graph 904 are independent of the runtime environment each logical operator may be associated with. As a result, the logical operators may be manipulated, analyzed, and optimized without need to correlate the changes or manipulations with the associated runtime environment.

Illustrative embodiments of the present invention may be used to generate both internal transformation graph models that are extensible to support new operators, appropriate execution code modules and data interchange code modules in order to execute a transformation job across multiple runtime engines, and code modules for different runtime engines from the same internal representation. For example, a data flow may be compiled into an execution graph for strict structured query language or into an execution graph for strict DataStage engine execution by using the appropriate code generator.

Figure 10:
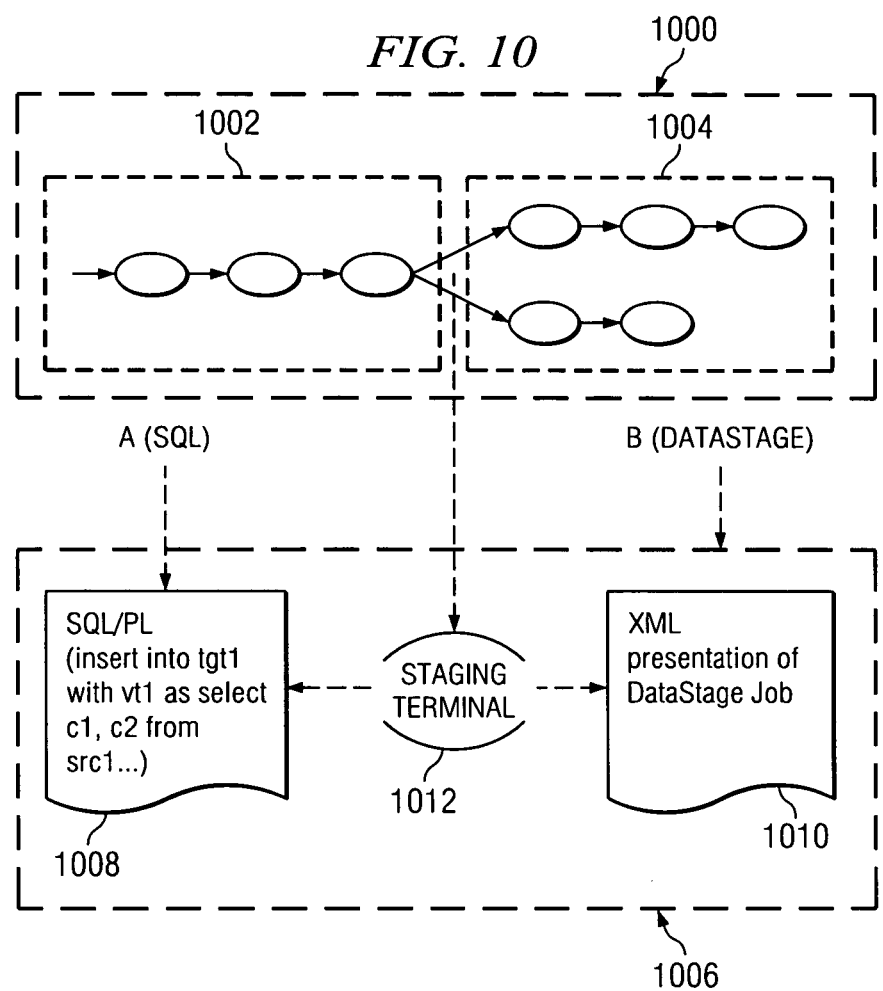
FIG. 10 is an exemplary data flow diagram for different runtime engines in accordance with an illustrative embodiment of the present invention.

FIG. 10 is an exemplary data flow diagram for different runtime engines in accordance with an illustrative embodiment of the present invention. Data flow 1000 includes multiple operations. In the following example, section A 1002 of the data flow 1000 includes operations run on a database server such as DB2. Section B 1004 includes operations run on a DataStage server. A code generation system such as code generation system 306 of FIG. 3 converts data flow 1000 into logical operator graph 1006 which may include SQL/PL statements 1008 and extensible mark-up language (XML) presentation 1010 for section A 1002 and section B 1004 respectively. Staging terminal 1012 is used to synchronize and pump the data between the two disparate sections.

The code generator takes the logical operator graph and converts the logical operator graph into an extended query graph model (EQGM) for analysis. The code generator maps logical operator graph operations to extended query graph model operations. In some cases, properties and linking dependencies are used to map the logical operator graph operations to extended query graph model operations. Additionally, a single logical operator graph may be mapped to multiple extended query graph model operations as necessary to represent the functionality of the original data flow. Extended query graph model is an extension to DB2 query graph model (QGM).

Query graph model is an internal representation of queries, capturing the entire semantics of SQL queries. Query graph model facilitates query semantic checking, optimization and execution plan generation. Query graph model is used as a core component in DB2 server's query processing as a proven industrial strength system.

A large set of extract, transform, load (ETL) operations may be mapped directly to natural structured query language (SQL) operations. For example, an extract, join, load operation may be mapped directly to a structured query language INSERT statement with a JOIN clause. An extract, filter, update operation may be mapped directly to a structured query language MERGE statement with a WHERE clause.

Extended query graph model extends query graph model with an architecture that is capable of handling all extract, transform, load operations that are either structured query language based or run on proprietary extract, transform, load engines. For example, extended query graph model includes new operations that represent other extract, transform, load operations. The new operations may be categorized into three types: structured query language operations, executable operations, and custom operations.

Structured query language operations are similar to existing query graph model operations, each structured query language operation represents an extract, transform, load operation that will be implemented by structured query language. The existing query graph model operations include operations such as, SELECT, GroupBy, SetOpr, Delete, Insert, and Update. The extended query graph model operations include operations such as, FileOpr, MergeOpr, and DiscardOpr. Executable operations represent an extract, transform, load operation that will be implemented by an executable such as Java program, shell script, or command line.

Custom operations represent an extract, transform, load operation that will be implemented by a special module or engine, such as an implementation provided by partners, third-parties, or another extract, transform, load engine. Custom operations not only provide a pluggable customizable operation, but also enable integration with other extract, transform, load engines.

Extended query graph model is a natural fit to present a diverse range of extract, transform, load operations that run on a database engine. Each extended query graph model operation has the operation type and properties. The code generation system may include a code generator for each query graph model operation type. The code generator generates code for each query graph model operation based on operation type and properties.

The code generation system also includes an extended query graph model converter that converts a logical operator graph to an extended query graph model graph. The extended query graph model converter maps a logical operator graph operator to multiple extended query graph model operations, and transforms relationships between extract, transform, load operations into extended query graph model entities and relationships.

The code generation system includes an execution plan graph generator that traverses and optimizes an extended query graph model graph, invokes code generator of each query graph model operation, and generates an execution plan graph that contains code units to be executed by the extract, transform, load engines.

The content of an extended query graph model contains operations and staging terminals. An operation represents a data set, and is associated with an operation such as SELECT, GROUP BY, UNION, INSERT, and MERGE. The content of an operation includes the description of the output data set the operation represents, and the description of how the output data set is computed such as structured query language, executable, or custom code. The description of the output data set of an operation contains information such as name, schema such as column descriptions, and column order. An operation also includes quantified tuple variables, called quantifiers, which range over other operations, and represent operands of the set operation.

Figure 11:
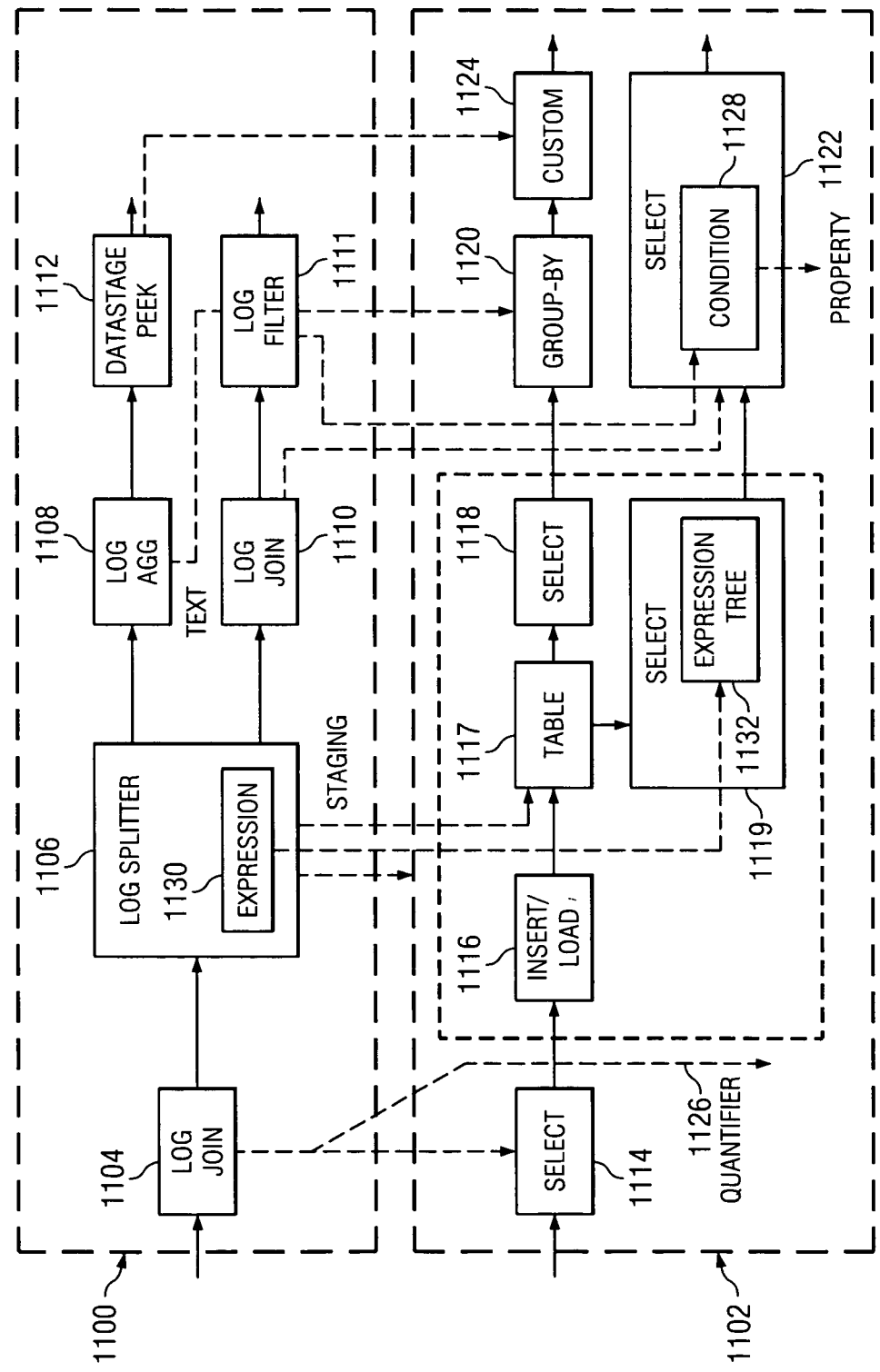
FIG. 11 is an exemplary flow diagram showing a logical operator graph mapped to an extended query graph model in accordance with an illustrative embodiment of the present invention.

FIG. 11 is an exemplary flow diagram showing a logical operator graph mapped to an extended query graph model in accordance with an illustrative embodiment of the present invention. FIG. 11 illustrates logical operator graph 1100 being mapped to an extended query graph model graph 1102. The mapping process may be performed by a code generator such as code generation system 306 of FIG. 3.

Logical operator graph 1100 includes various operations including join 1104, splitter 1106, aggregate 1108, join 1110, filter 1111, and DataStage peek 1112. Each operator of logical operator graph 1100 may be mapped directly to an extended query graph model operation, transformed to a set of table functions and stored procedures, converted directly to an extended query graph model quantifier, or mapped to properties of an extended query graph model entity. Extended query graph model 1102 includes various operations mapped from logical operator graph 1100 including select 1114, insert/load 1116, table 1117, select 1118, select 1119, group-by 1120, select 1122, and custom 1124.

In the example of FIG. 11, aggregate 1108 operator is mapped directly to group-by 1120 operation of extended query graph model 1102. Splitter 1106 is mapped to insert/load 1116, table 1117, select 1118, and select 1119 in extended query graph model 1102. In some cases, a logical operator graph operator may be mapped to multiple operations. For example, an extract, transform, load operator, such as splitter 1106, does not have native structured query language set function support. As a result, splitter 1106 is represented by multiple structured query language operations, insert/load 1116, table 1117, select 1118, and select 1119.

In some cases, a logical operator graph operator may be mapped to extended query graph model quantifiers. For example, join 1104 operator in logical operator graph 1100 is converted into an extended query graph model node and the quantifier that represents a predicate such as select 1114 and quantifier 1126.

In some cases, a logical operator graph operator may be converted to extended query graph model properties. For example, a logical operator graph filter operator such as filter 1111 is transformed to condition property 1128 of the extended query graph model operator select 1122. In other cases, an expression in logical operator graph 1100 is converted to an expression tree in extended query graph model 1102 and linked to related extended query graph model operations and edges. If the expression represented in logical operator graph 1100 is already a parser tree, it can be used directly by extended query graph model 1102. For example, an expression such as expression 1130 is converted to an expression tree 1132 which is linked to extended query graph model operation select 1119.

Figure 12:
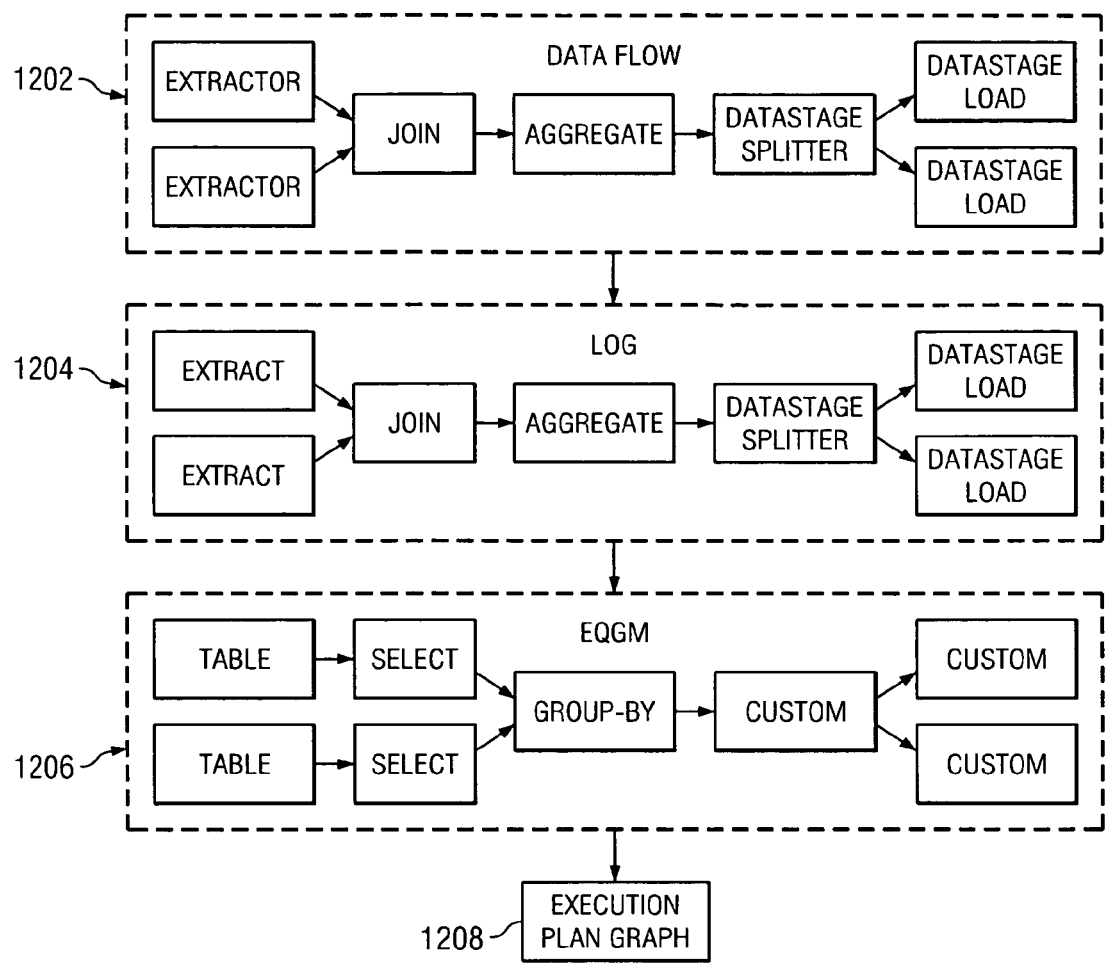
FIG. 12 is an exemplary flow diagram of code generated by a code generation system in accordance with an illustrative embodiment of the present invention.

FIG. 12 is an exemplary flow diagram of code generated by a code generation system in accordance with an illustrative embodiment of the present invention. FIG. 12 is a more detailed illustration of the elements of FIG. 9. Data flow 1202 includes various operations used by a code generation system to generate logical operator graph 1204 based on data flow 1202. Logical operator graph 1204 is converted to extended query graph model 1206, which is in turn translated to execution plan graph 1208. The functionality and performance of each operation is maintained from data flow 1202 to execution plan graph even if different code or operations are used by logical operator graph 1204, extended query graph model 1206, and extended plan graph 1208. The code generated for FIG. 12 may be performed by a code generator such as code generation system 306 of FIG. 3.

For example, the operations of execution plan graph 1206 may be in structured query language procedural language or other runtime artifacts. For a mixed data flow in which parts of data flow 1202 are run on different runtime engines, non-SQL operators in logical operator graph 1204 may be mapped to custom nodes in extended query graph model 1206. The runtime engines for different operators may be specified by the designer. The runtime engine may also be specified by the code generation system based on the characteristics of the data and the available target engines.

Figure 13:
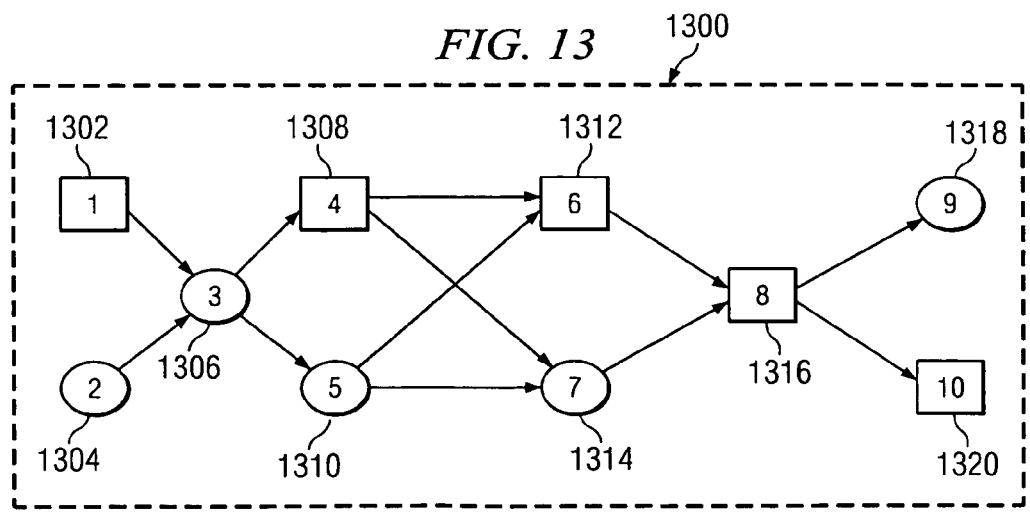
FIG. 13 is a data flow diagram interconnecting multiple operators for a data integration system in accordance with an illustrative embodiment of the present invention.

FIG. 13 is a data flow diagram interconnecting multiple operators for a data integration system in accordance with an illustrative embodiment of the present invention. Data flow 1300 represents a logical transformation and flow of data. Data flow 1300 may be a data flow such as data flow 302 of FIG. 3. Transformations are identified by operators. The data flow is designed by the user to implement business logic, but the transformations represented by the operators in data flow 1300 are executed on a platform that is capable of performing these transformations. The platform may be any type of runtime engine, including for example, a DataStage engine or a structured query language engine.

Data flow 1300 includes operator 1 1302, operator 2 1304, operator 3 1306, operator 4 1308, operator 5 1310, operator 6 1312, operator 7 1314, operator 8 1316, operator 9 1318, and operator 10 1320. Users connect the operators of data flow 1300 by directed links. Directed links serve two purposes. First, the directed links indicate the flow of data from operator to operator and second, the directed links indicate the order in which data flows between operators. In the process of classifying and sequencing of operators, user intent for both these purposes is retained. Directed links are shown in FIG. 13 as arrows connecting the operators.

Data flow 1300 is a mixed-mode data flow because data flow 1300 includes operators of different types. Operators are classified into different types based on the runtime engine they are run on. Operators are also characterized by whether they produce data for the data flow, consume data, or transform data. The differently characterized operators are referred to as source operators, target operators and transform operators respectively.

Data flow 1300 may include any number of operator types. In the example of FIG. 13 includes data flow 1300 is characterized by two different types of operators represented by a square and ellipse. The square shaped operators, such as operator 1 1302 and operator 4 1308, may be structured query language (SQL) operators. The ellipse shaped operators, such as operator 2 1304 and operator 5 1310, may be DataStage operators. Data flow 1300 is a mixed mode data flow with 10 operators. Operator 1 1302 and operator 2 1304 do not consume any data, these operator only produce data that is consumed by operator 3 1306.

Operator 3 1306 is also a producer, producing data for operator 4 1308 and operator 5 1310. Operator 4 1308 produces data for operators operator 6 1312 and operator 7 1314. Operator 5 1310 also produces data for operator 6 1312 and operator 7 1314. Operator 6 1312 and operator 7 1314 produce data that is consumed by operator 8 1316. Operator 9 1318 and operator 10 1320 consume data produced by operator 8 1316.

The dependencies of the operations require that operator 1 1302 and operator 2 1304 are executed before operator 3 1306. Operator 3 1306 execute before operator 4 1308 and operator 5 1310. Operator 4 1308 and operator 5 1310 both finish execution before operator 6 1312 and operator 7 1314. Operator 8 1316 may start after operator 6 1312 and operator 7 1314 have finished, and operator 8 1316 finish before operator 9 1318 or operator 10 1320 begins.

An illustrative embodiment of the present invention provides a computer implemented method, apparatus, and computer usable program code wherein operators may execute on different runtime engines, but are represented in the same data flow 1300. Without this capability, users would first have to plan their business transformation, identify operators that perform the transformation, classify and segregate operators of the same type that execute on a particular runtime engine, gather such operators in their respective data flows, and then manually order the execution of these data flows to ensure there is a logical flow of data between the runtime engines. Each data flow executes in an engine that supports operators of a particular type. A region is a data flow that contains operators of the same type. As a result, operators of the same type in a mixed-mode data flow such as data flow 1300 are grouped together into regions. Data flow 1300 is thus made up of many regions connected together.

Figures 14, 15:
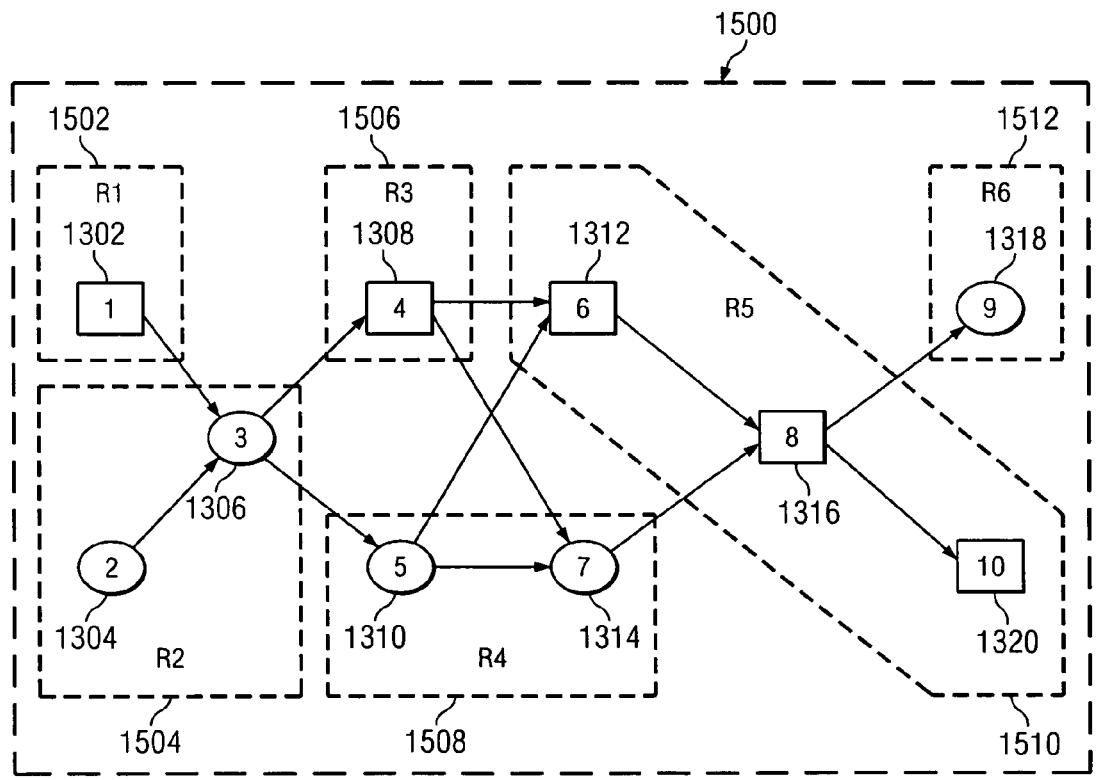
FIG. 14 is a table representing operator classification of FIG. 13 in accordance with an illustrative embodiment of the present invention.
FIG. 15 is the data flow of FIG. 13 classified by region in accordance with an illustrative embodiment of the present invention.

FIG. 14 is a table representing operator classification of FIG. 13 in accordance with an illustrative embodiment of the present invention. Table 1400 is used to classify the operations of data flow 1300 of FIG. 13. Each operator is divided into regions 1402, classified according to type 1404, and each region is assigned execution order 1406 according to operators 1408.

The types supported in the current implementation are DataStage operators and structured query language (SQL) operators. DataStage operators are executed against the DataStage engine, and structured query language operators are executed against a DB2 database engine. The classification of operators 1408 within a data flow is extensible allowing other operator types corresponding to other runtime engines to be added as needed.

During classification, operators 1408 belonging to the same type 1404 are grouped together relative to their position within the data flow. As many operators of the same type 1404 are grouped together as allowed by the data flow. A data flow starts with one or more source operators and ends with one or more target operators. Beginning with the target operators the classification process performs a breadth-first search (BFS), assigning each operator in the data flow type 1404 and region 1402. Each region 1402 is also assigned an execution order 1406. The execution order indicates the sequencing of execution of regions within the data flow.

During the classification process each operator "parent" is analyzed to determine the operator's "children" or "child" that provide some data to the parent operator. In the process of breadth-first search, if the child operator is of a different type 1404 than the parent operator, the child operator is placed in region 1402 which may be shared with other children operators. Each region 1402 is also assigned a numeric value in execution order 1406. Execution order 1406 is a function of the execution order of the parent operator. Regions are linked together. The links represent the flow of data from region to region. The entire breadth-first search process is recursive.

FIG. 15 is the data flow of FIG. 13 classified by region in accordance with an illustrative embodiment of the present invention. Data flow 1500 is data flow 1300 of FIG. 13 classified by region. The goal is to group operators of the same type together into regions, so that each region can be sent off to a runtime engine that understands the operators in the region. Additionally, each region is sequenced so that each region is executed only after its dependencies have been satisfied.

Operator 1 1302 cannot be grouped with any other operator because operator 1 1302 does not connect to any operator of its type. As a result, operator 1 1302 is placed in its own region R1 1502, whose type is square shaped corresponding to a structured query language operator.

Operator 2 1304 and operator 3 1306 are grouped into a single region, R2 1504, whose type is ellipse shaped corresponding to a DataStage operators. R2 1504 depends on R1 1502 because of the link between operator 1 1302 and operator 3 1306, so R1 1502 is sequenced before R2 1504.

Although operator 4 1308 and operator 6 1312 are the same type and are connected together, these operator are not placed in the same region. Operator 6 1312 needs input from both operator 4 1308 and operator 5 1310, and operator 7 1314 needs input from operator 4 1308 and operator 5 1310. If operator 4 1308 and operator 6 1312 were placed in the same region the new region would have a circular dependency. As a result, operator 4 1308 is placed in a separate region, R3 1506. R3 1506 depends on R2 1504 because of the link between operator 3 1306 and operator 4 1308. The separation of operator 4 1308 into region R3 1506 ensures that R2 1504 executes before R3 1506.

Operation 5 1310 and operation 7 1314 are grouped into region R4 1508. R4 1508 depends on R3 1506 because of the link between operator 4 1308 and operator 7 1314. R4 1508 also depends on R2 1504 because of the link between operator 3 1306 and operator 5 1310. The execution order ensures that R4 1508 executes only after R2 1504 and R3 1506 have finished.

Operator 6 1312, operator 8 1316, and operator 10 1320 are grouped into a single region R5 1510 because each is of the same type. R5 1510 depends on R3 1506 because of the link between operator 4 1308 and operator 6 1312. Similarly, R5 1510 depends on R4 1508 because of the link between operator 7 1314 and operator 8 1316 so we ensure that R5 1510 executes only after R3 1506 and R4 1508 have finished executing. Operator 9 1318 is grouped into its own region, R6 1512 because it does not connect to any operator of the same type.

Data flow 1500 is now classified by a set of regions. Each region includes operators of the same type.

Figure 16:
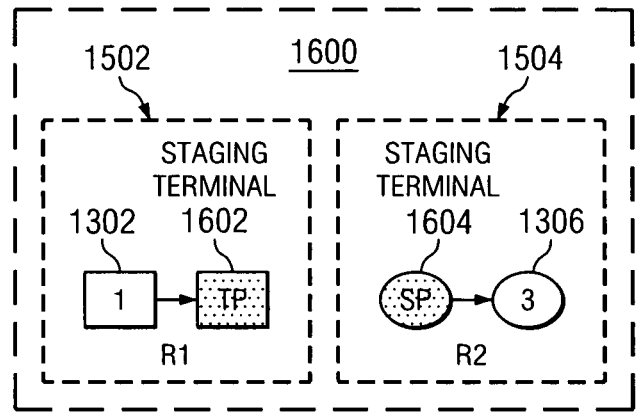
FIG. 16 is a partial data flow diagram from FIG. 15 with inserted staging terminals in accordance with an illustrative embodiment of the present invention.

FIG. 16 is a partial data flow diagram from FIG. 15 with inserted staging terminals in accordance with an illustrative embodiment of the present invention. Partial data flow 1600 shows operator 1 1302 of R1 1502 and operator 3 1306 of R2 1504 of FIG. 15. The regions need to move data from one region to another because each region executes in a different runtime engine. The different engine types need to be able to pass data to ensure the data flow is effectively executed.

Staging terminal 1602 and staging terminal 1604 are inserted to link region R1 1502 and region R2 1504. Staging terminals are placeholders for other operators that will perform the actual work of importing and exporting data from the regions. Staging terminals allow users to design data flows with a mix of operators that run on different runtime engines without sequencing them by external means, transferring data in and out of the runtime engines by external means.

Staging terminals are placeholders for "real" source or target operators that perform the actual work of importing or exporting data. Staging terminal 1602 and staging terminal 1604 are shown as smaller versions of operator 1 1302 and operator 3 1306, respectively. Staging terminal 1602 is a target operator that is replaced at code generation time with a region-specific target operator. Staging terminal 1604 is a source operator that is also replaced at code generation time with a region-specific source operator. Each region has its own set of source and target operators. When operators, operator types, and regions are defined, users also specify source and target operators for each region. Operators on either side of a link are evaluated, if the operators belong to two or more regions, the existing link is broken and the operators are connected to staging terminals.

Figure 17:
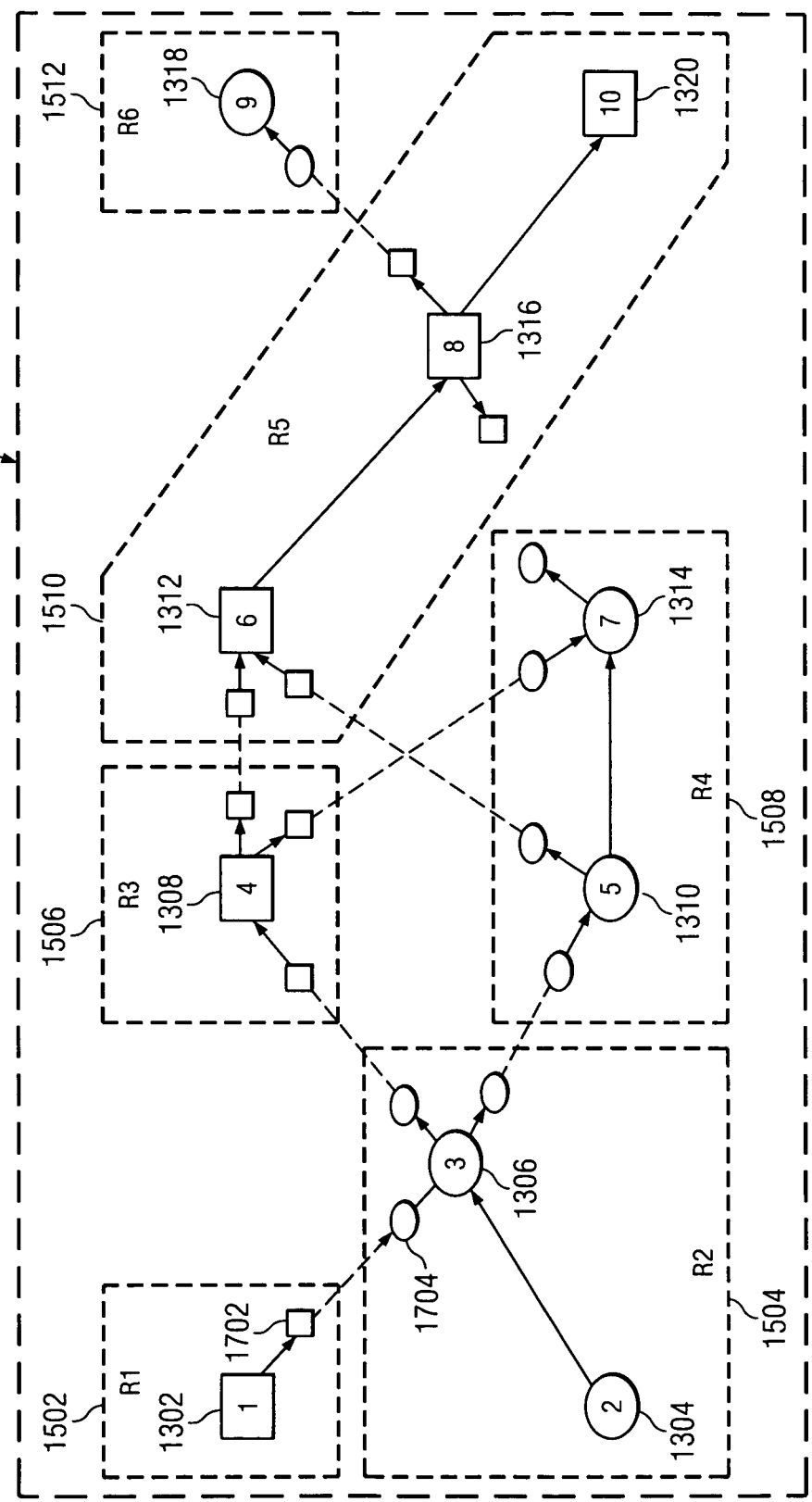
FIG. 17 is the data flow of FIG. 15 with staging terminals separating regions divided into regions and with staging terminals in accordance with an illustrative embodiment of the present invention.

FIG. 17 is the data flow of FIG. 15 with staging terminals separating regions divided into regions and with staging terminals in accordance with an illustrative embodiment of the present invention. Data flow 1700 includes the regions of data flow 1500 of FIG. 15. Staging terminal 1702 and staging terminal 1704 are shown as examples of the other staging terminals between each region.

Figure 18:
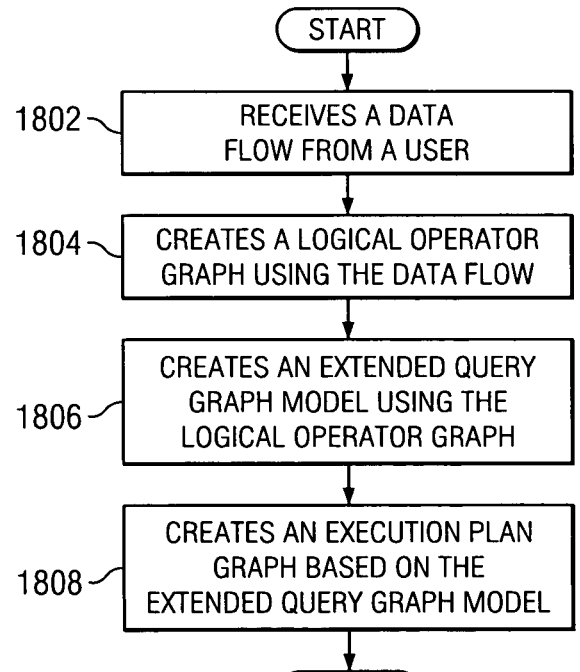
FIG. 18 is a flowchart illustrating operation of a data integration system in accordance with an illustrative embodiment of the present invention.

FIG. 18 is a flowchart illustrating operation of a data integration system in accordance with an illustrative embodiment of the present invention. The process of FIG. 18 may be implemented in a code generation system such as code generation system 306 of FIG. 3.

The code generation system receives a data flow from a user (step 1802). The data flow may be received from a user interface tool. Next, the code generation system creates a logical operator graph using the data flow (step 1804). The logical operator graph is a metadata representation of the data flow. In the case of extract, transform, load operators, the logical operator graph is the internal representation of ETL operations and mappings. In addition, the logical operator graph may be used to represent the optimized pertinent portion of the source data flow built by users of the system.

Next, the code generation system creates an extended query graph model using the logical operator graph (step 1806). During step 1806 processing logic and optimization algorithms may be used to more efficiently represent the logical operator graph in an extended query graph model. The code generation system creates an execution plan graph based on the extended query graph model (step 1808) with the process terminating thereafter. The execution plan graph created during step 1808 may be sent to the runtime engines for execution as needed.

FIG. 19 is a flowchart illustrating data flow code generation in accordance with an illustrative embodiment of the present invention. The process of FIG. 19 may be data processing framework such as data processing framework 500 of FIG. 5. The process begins classifying a data flow (step 1902). Step 1902 may be performed by a classifier such as LOG region classifier 510 of FIG. 5. Step 1902 may further involve splitting the operators in the input data flow into multiple regions based on which runtime engine supports the operation, identifying inter-region connection point and placing staging terminals at those connection points, and arranging the regions in order of intended execution.

Next, the process determines if region has been optimized (step 1904). If each region has been optimized, the process terminates. If each region has not been optimized in step 1904, each region is optimized (step 1906). The optimization of step 1906 may be performed by a region specific classifier and optimizer such as region specific classifier and optimizer 514 of FIG. 5. In an illustrative embodiment, each region may be optimized sequentially. In another illustrative embodiment, multiple regions may be optimized in parallel. Step 1904 provides post classification processing and optimization such as classified optimized regions 516 of FIG. 5. For example, step 1904 may amend or compensate for generic classification decisions.

For example, sometimes when newer regions are added, there may be some non-optimal decisions made when the generic LOG classifications are done. In such a case, region specific classifier optimizers may be able to programmatically provide better performance post-classification processing, on a case by case basis. One example, is when an operator classified into a region may support, say a File staging input, but only under very restricted conditions (and hence is not advertised as supporting File staging in its operator definition), and if the generic classifier provided a staging terminal that converted a file into a table, as an un-optimized choice. In such a case, a region specific classification-optimizer may then programmatically decide, based on that very specific situation, that a file is indeed directly acceptable for that operator instance in that region. Having made such a decision, the region specific classifier optimizer would then update the staging terminal itself to provide a file as output. Such a staging terminal would now have a file as input and file as output, which basically would result, during code generation, in no staging code being needed, thereby removing an unnecessary transformation step.

Next, the process invokes the data flow code generator (step 1908). The process determines if code has been generated for each region (step 1910). If code has not been generated for each region, code is generated for each region (step 1912). During step 1912 deployment, execution, and un-deployment plans are generated for each region. Next, the process generates staging code (step 1914). Staging code is generated for every inter-region link or staging terminal such as staging terminal 606 of FIG. 6. The data flow code generator used in step 1908 and step 1914 may be a code generator such as LOG code generator and optimizer 518 of FIG. 5.

Next, the process aggregates all region plans (step 1916). In step 1916 deployment, execution, and un-deployment plans are aggregated from each region for the complete data flow. Step 1916 may be performed by a LOG plan aggregator such as LOG plan aggregator 524 of FIG. 5. If code has been generated for each region in step 1910, the process generates staging code (step 1914) and aggregates all region plans (step 1916).

Next, the process traverses each region (step 1918). The process determines if each operator in the region has been processed (step 1920). If the operator has not been processed, the process resolves staging with neighboring operators (step 1922). For example, if needed during step 1922, the process generates code for intermediate tables, files, or queues. Next, the process invokes operator's code generator (step 1924). An operator code generator such as operator specific code generator 520 of FIG. 5 may be used in steps 1922-1926. During step 1926 code units are produced and tagged as deployment, run, or un-deployment. Next, the process places code units into plans (step 1926). During step 1926 code units such as code units 522 of FIG. 5 are placed in deployment, un-deployment and runtime plans for the region.

If each operator in the region has been processed in step 1920, the process places code units into plans (step 1926).

Next, the process performs post aggregation processing (step 1928). Step 1928 is used to process the deployment, run, and un-deployment plans for the complete data flow. The process determines whether each region has been aggregated (step 1930). If each region has been aggregated, the process terminates. If a region has not been aggregated in step 1930, the process aggregates the region (step 1932). Step 1932 may be performed by a region specific aggregator such as region specific aggregators 526 of FIG. 5. Region specific aggregation may be performed based on the runtime engine of the region and respective operators in the region by a region specific aggregator. Additionally, region specific aggregators may be added as needed for newer runtime engines. In addition, during step 1932, the region specific aggregator may amend, compensate, optimize, or clean up previously performed generic aggregations. The final output may be an output such as output 528 of FIG. 5.

Figure 20:
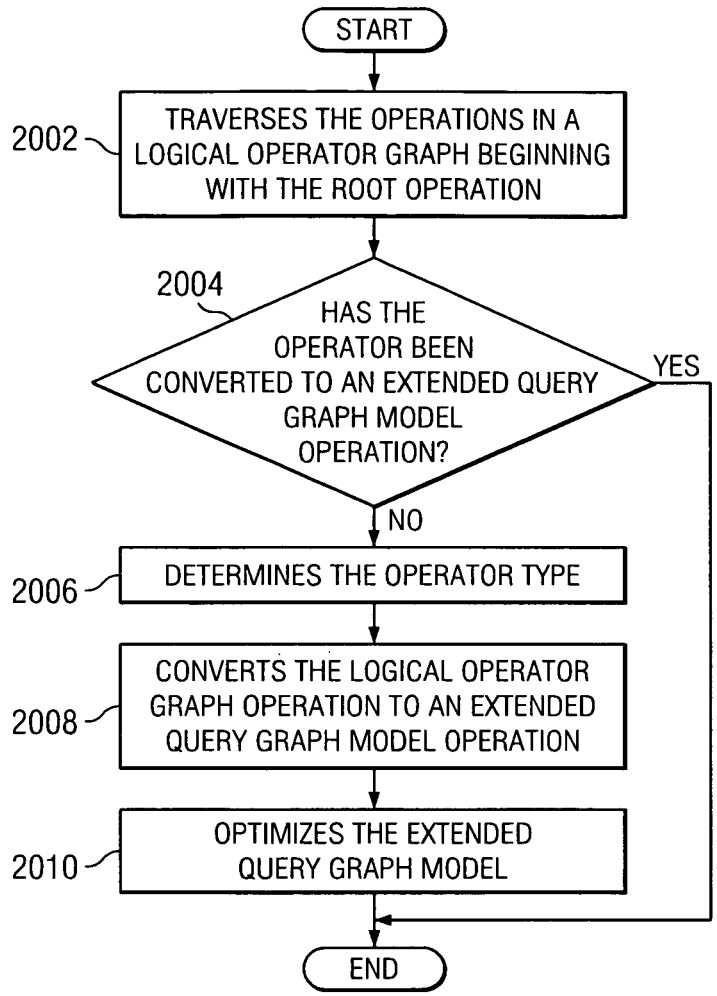
FIG. 20 is a flowchart illustrating the process of converting a logical operator graph to an extended query graph model in accordance with an illustrative embodiment the present invention.

FIG. 20 is a flowchart illustrating the process of converting a logical operator graph to an extended query graph model in accordance with an illustrative embodiment the present invention. The process of FIG. 20 is a more detailed description of the process of step 1806 of FIG. 18. The process may convert a logical operator graph to a extended query graph model such as logical operator graph 1100 and extended query model graph 1102 of FIG. 11.

The process begins as the code generation system traverses the operations in a logical operator graph beginning with the root operation (step 2002). The process determines whether the operator has been converted to an extended query graph model operation (step 2004). If the operation has been converted the process ends. If the operation has not been converted in step 2004, the code generation unit determines the operator type (step 2006). Next, the code generation unit converts the logical operator graph operation to an extended query graph model operation (step 2008). The code generation optimizes the extended query graph model (step 2010) with the process terminating thereafter.

Figure 21:
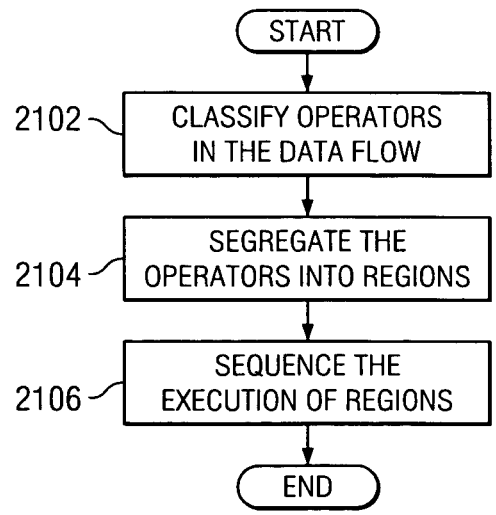
FIG. 21 is a flowchart illustrating operator classification, grouping, and ordering in accordance with an illustrative embodiment of the present invention.

FIG. 21 is a flowchart illustrating operator classification, grouping, and ordering in accordance with an illustrative embodiment of the present invention. The process may be implemented in a logical operator graph processing system or component such as LOG classifier 702 of FIG. 7. The data flow processed may be a data flow such as data flow 1300 of FIG. 13.

The process begins by classifying operators in the data flow (step 2102). The operators are classified according to the execution order and order type in a table such as table 1400 of FIG. 14. Next, the process segregates the operators into regions (step 2104). Operators with the same sequence and are grouped together in regions. Because each region contains operators with the same sequence, the sequence of the region may be considered to be the sequence of the operators in each region. The process then sequences the execution of regions (step 2106) with the process terminating thereafter. In step 2106, the regions are sorted in descending order of their sequence to create an execution order of the regions. At the end of step 2104 the process of classification of operators into regions and the sequencing of regions is complete. The ordering of regions in step 2106 determines the execution order. The regions are then designated for a runtime engine corresponding to the type of the region.

Figure 22:
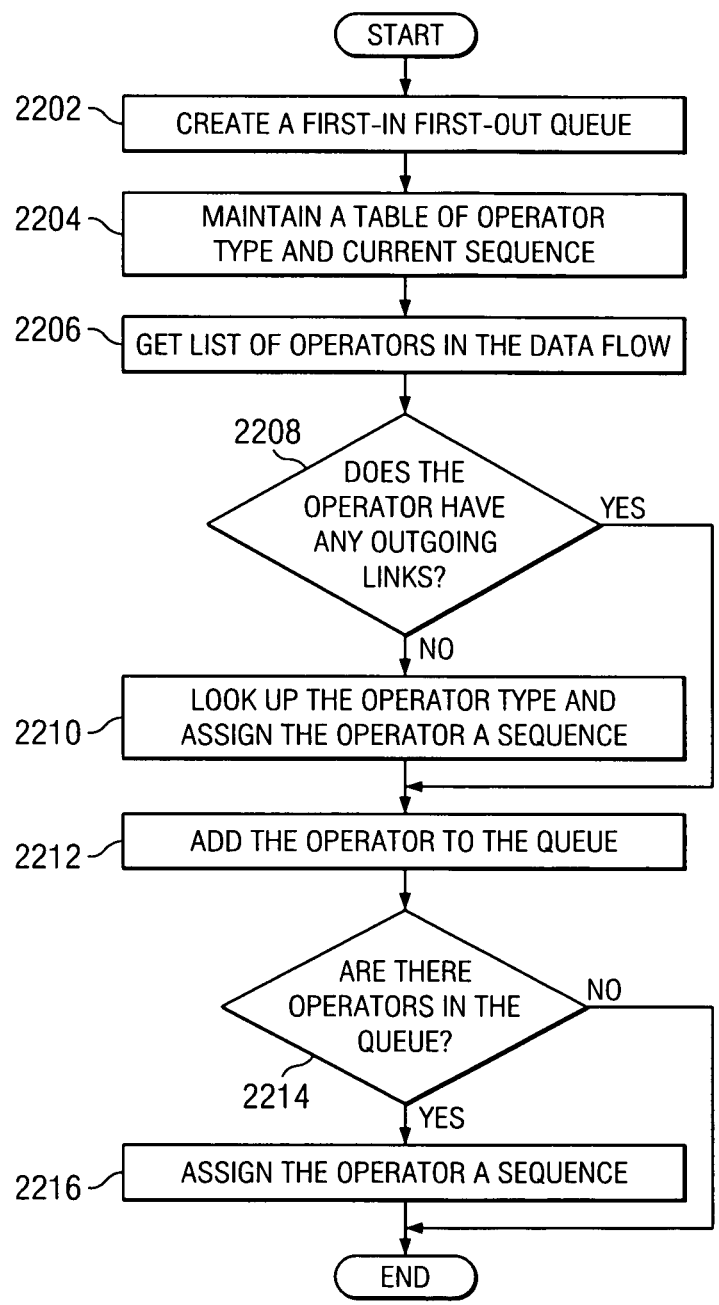
FIG. 22 is a flowchart illustrating classification of operators in the data flow in accordance with an illustrative embodiment of the present invention.

FIG. 22 is a flowchart illustrating classification of operators in the data flow in accordance with an illustrative embodiment of the present invention. The process of FIG. 22 is a more detailed description of step 2102 of FIG. 21. The process begins by creating a first-in first-out queue (step 2202). The process maintains a table of operator type and current sequence (step 2204). The operator type and sequence of the operator are classified according to a table such as table 1400 of FIG. 14. The table is used to keep track of the sequence number for each type of operator. Initially, each type will have a sequence number initialized to the ordinal number of the type. For example, if there are three types of operators each type would be assigned as 1, 2, or 3.

Next, the process gets the list of operators in the data flow (step 2206). The process determines if the operator has any outgoing links (step 2208). If the operator does not have any outgoing links, the process looks up the operator type and assigns the operator a sequence (step 2210). The process adds the operator to the queue (step 2212). Next, the process determines if there are operators in the queue (step 2214). If there are operators in the queue, the process assigns the operator a sequence (step 2216) with the process terminating thereafter. If there are not operators in the queue, the process ends. If the process determines the operator does have outgoing links in step 2208, the process adds the operator to the queue (step 2212).

FIG. 23 is a flowchart illustrating operator sequencing in accordance with an illustrative embodiment of the present invention. The process of FIG. 23 is a more detailed description of step 2216 of FIG. 22 performed while there are operators in the queue. The process begins by setting the next operator in the queue as the parent (step 2302). Next, the process determines if the parent has a child (step 2304). If the parent does not have a child the process ends. If the parent does have a child in step 2304, the process determines if the parent is the same type as the child (step 2306). The parent operation is the same as the child operation if they are designated to be executed by the same type of runtime engine.

If the parent is the same type as the child, the process determines if the child's sequences less than the parent's sequence (step 2308). If the child's sequence is less than the parent sequence, the process sets the child's sequence equal to the parent's sequence (step 2310). Next, the process adds the child to the queue (step 2312) with the process terminating thereafter. If the child's sequence is not less than the parent's sequence in step 2308, the process adds the child to the queue (step 2312).

If the parent is not the same type as the child in step 2306, the process sets the child's sequence equal to the current order for the child's type (step 2314). The current order is specified by a sequence number in the table. Next, the process determines if the child's sequence is less than the parent's sequence (2316). If the child's sequence is not less than the parent's sequence, the process adds the child to the queue (step 2312). If the child's sequence is less than the parent's sequence in step 2316, the process gets the next sequence for the child (step 2318) before returning in a loop to the determination of step 2316. The child's sequence is always set to be greater than or equal to the parent's sequence.

FIG. 24 is a flowchart illustrating receiving the next sequence for an operator in accordance with an illustrative embodiment of the present invention. The process of FIG. 24 is a more detailed description of step 2318 of FIG. 23. The process begins by setting the sequence equal to the current sequence for the child's type (step 2402). Next, the process sets the sequence equal to the sequence plus the number of operator types (step 2404). Step 2404 ensures that for a given operator, the sequence number modulo or number of types of operators, is always the same as for other operators of the same type. The process then stores the sequence in the table (step 2406). The process returns the sequence (step 2408) with the process terminating thereafter.

Figure 25:
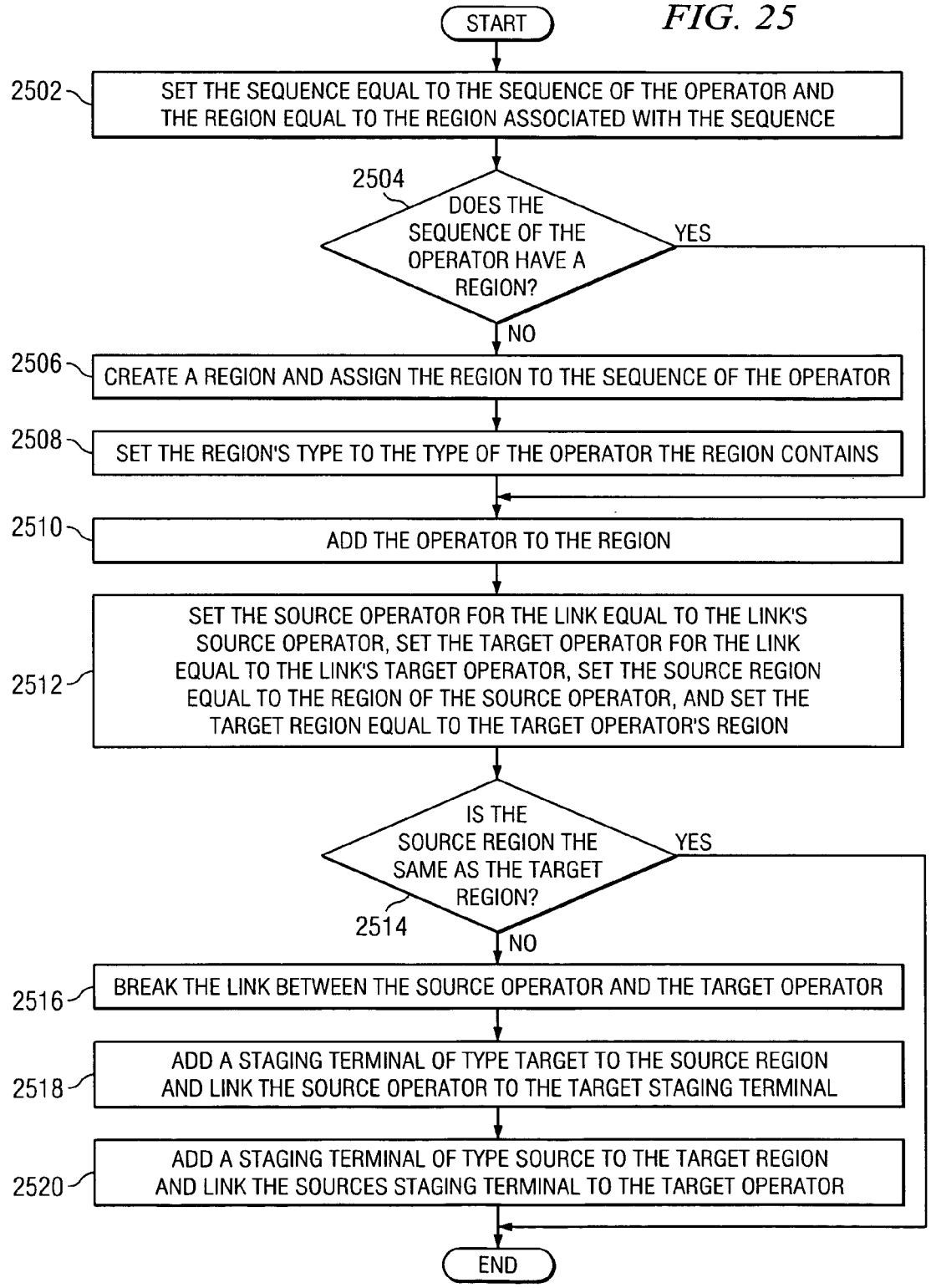
FIG. 25 is a flowchart illustrating separating operators into regions in accordance with an illustrative embodiment of the present invention.

FIG. 25 is a flowchart illustrating separating operators into regions in accordance with an illustrative embodiment of the present invention. The process of FIG. 25 is a more detailed description of step 2104 of FIG. 21 and is implemented for all operators and links in the data flow. The process begins by setting the sequence equal to the sequence of the operator and the region equal to the region associated with the sequence (step 2502). Next, the process determines if the sequence of the operator has a region (step 2504). If the sequence of the operator does not have a region, the process creates a region and assigns the region to the sequence of the operator (step 2506). The process then sets the region's type to the type of the operator the region contains (step 2508). Next, the process adds the operator to the region (step 2510). If the process determines the sequence of the operator has a region in step 2504, the process adds the operator to the region (step 2510). Steps 2502-2510 are performed for the operators of the data flow.

Next, the process sets the source operator for the link equal to the link's source operator, sets the target operator for the link equal to the link's target operator, sets the source region equal to the region of the source operator, and sets the target region equal to the target operator's region (step 2512). Next, the process determines if the source region is the same as the target region (step 2514). If the source region is not the same as the target region, the process breaks the link between the source operator and the target operator (step 2516). The process adds a staging terminal of type target to the source region and links the source operator to the target staging terminal (step 2518). The process adds a staging terminal of type source to the target region and links the source staging terminal to the target operator (step 2520) with the process terminating thereafter. The target staging terminal corresponds to the source target and the source staging terminal corresponds to the target region. If the source region is the same as the target region in step 2514, the process ends.

Aspects of the present invention provide a computer implemented method, apparatus and computer usable program code for integrating data flow in data environments. The data integration architectures model receives a user data flow, which is then processed by one or more runtime engines. The data flow is automatically modeled to run on different runtime engines in proper sequence with automatic data exchange between different runtime engines without user interaction.

The data integration system allows for customized code generation for exchanges between two known engines without customizing the interaction between the engines. For example, since a DataStage extract, transform, load (ETL) engine is capable of accessing DB2 database tables, the data integration system would instead generate code to exchange data inside structured query language (SQL) views or structured query language tables rather than files.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for generating code for an integrated data system, the computer-implemented method comprising:
  receiving a mixed data flow containing mixed data flow operators, the mixed data flow operators collectively defining operations to be performed to complete the mixed data flow, wherein a first of a plurality of runtime environments of distinct types is selected to perform a given one of the defined operations, wherein the given operation is dependent on at least one other operation performed in a second of the plurality of runtime environments;
  generating, based on the mixed data flow, a logical operator graph containing logical operators independent of the plurality of runtime environments;
  converting the logical operator graph to an extended query graph model in which the logical operators are converted to model operators associated with the plurality of runtime environments;

analyzing the extended query graph model in order to pre-optimize code generation to include at least one of chunking and execution parallelism;

subsequent to analyzing the extended query graph model, converting the extended query graph model via code generation by operation of one or more computer processors into an execution plan graph executable on the plurality of different types of runtime environments; and executing the execution plan graph by an execution engine that invokes a plurality of runtime engines, each runtime engine being of a distinct runtime engine type corresponding to a respective one of the plurality of runtime environments.

2. The computer implemented method of claim 1, wherein the plurality of runtime engines includes any of an extract, transform, load engine, a DataStage engine, and structured query language engine.

3. The computer implemented method of claim 1, wherein the graph operators are logical operator graph operators, wherein the model operators are extended query graph model operators, wherein converting the logical operator graph to the extended query graph model comprises:

mapping the logical operator graph operators to the extended query graph model operators; and transforming relationships between respective operations of the logical operator graph operators to relationships between respective operations of the extended query graph model operators.

4. The computer implemented method of claim 1, wherein converting the logical operator graph to the extended query graph model comprises:

converting a logical operator graph operation directly to an extended query graph model quantifier.

5. The computer implemented method of claim 1, wherein converting the logical operator graph to the extended query graph model comprises:

mapping properties of a logical operator graph operation to properties of an extended query graph model entity.

6. The computer implemented method of claim 1, wherein converting the logical operator graph to the extended query graph model comprises:

mapping a logical operator graph operation to a property of an extended query graph model operator.

7. The computer implemented method of claim 1, wherein converting the logical operator graph to the extended query graph model comprises:

transforming a logical operator graph operation to any of a set of table functions, and stored procedures to invoke an executable program.

8. The computer implemented method of claim 1, wherein converting the logical operator graph to the extended query graph model comprises:

converting an expression in the logical operator graph to an expression tree in the extended query graph model.

9. The computer implemented method of claim 1, comprising:

performing analysis and optimization of the logical operator graph, the extended query graph model, and the execution plan graph, respectively.

10. The computer implemented method of claim 1, wherein the extended query graph model includes structured query language operations, executable operations, and custom operations.

11. The computer implemented method of claim 1, wherein the logical operator graph is a metadata representation of the mixed data flow.

12. The computer implemented method of claim 1, where the computer-implemented method is to generate the execution plan graph from the mixed data flow and for execution on the plurality of different types of runtime environments programmatically selected as satisfying a set of predefined criteria;

wherein the extended query graph model in analyzed in order to pre-optimize code generation to include both chunking and execution parallelism;

wherein chunking comprises breaking one subset of the mixed data flow into multiple units in order to improve execution efficiency, wherein execution parallelism comprises grouping disparate sets of operations within the mixed data flow and executing the disparate sets in parallel in order to further improve execution efficiency;

wherein the model operators allow for analysis of operations for the mixed data flow, wherein the mixed data flow is received from a user, wherein the operation is selected based on user input, wherein a processing application is programmatically selected, wherein the processing application and first runtime environment are not selected based on any user input;

wherein the plurality of different types of runtime environments are programmatically selected as satisfying the set of predefined criteria;

wherein the processing application is programmatically determined to satisfy a predefined suitability condition, wherein the suitability condition is satisfied upon identifying a matching runtime environment;

wherein the mixed data flow consists of a plurality of data flows specified in a single request from a user, wherein each data flow in a plurality of data flows is of a distinct data type;

wherein the computer-implemented method further comprises:

outputting an indication that the execution plan graph was executed.

13. The computer implemented method of claim 12, wherein the operations to be performed to complete the mixed data flow as defined by the mixed data flow operators include:

(i) a first predefined operation comprising extracting data from one or more files;

(ii) a second predefined operation comprising extracting data from one or more tables;

(iii) a third predefined operation comprising filtering said data;

(iv) a fourth predefined operation comprising joining data extracted from one or more tables with data extracted from one or more files;

(v) a fifth predefined operation comprising removing duplicate data;

(vi) a sixth predefined operation comprising saving data in a file; and (vii) a seventh predefined operation comprising loading data onto a target.

14. The computer implemented method of claim 13, wherein converting the logical operator graph to the extended query graph model comprises:

(i) converting a logical operator graph operation directly to an extended query graph model quantifier;

(ii) mapping properties of a logical operator graph operation to properties of an extended query graph model entity;

(iii) mapping a logical operator graph operation to a property of an extended query graph model operator;

(iv) transforming a logical operator graph operation to any of a set of table functions, and stored procedures to invoke an executable program; and (v) converting an expression in the logical operator graph to an expression tree in the extended query graph model.

15. The computer implemented method of claim 14, wherein the graph operators are logical operator graph operators, and wherein the model operators are extended query graph model operators;

wherein the one or more runtime engines is any of an extract, transform, load engine, a DataStage engine, and structured query language engine, wherein the converting the graph step further comprises:

(i) mapping the logical operator graph operators to the extended query graph model operators; and (ii) transforming relationships between respective operations of the logical operator graph operators to relationships between respective operations of the extended query graph model operators;

wherein the computer-implemented method further comprises:

performing analysis and optimization of the logical operator graph, extended query graph model, and the execution plan graph;

wherein the extended query graph model includes structured query language operations, executable operations, and custom operations, wherein the logical operator graph is a metadata representation of the mixed data flow.

16. The computer-implemented method of claim 15, further comprising performing a first operation to dilate a sub-flow operator in a first data flow comprising the mixed data flow, the first operation comprising:

traversing the first data flow to locate sub-flow operators, wherein each sub-flow operator is associated with a corresponding sub-flow, each sub-flow itself comprises a set of one or more operators, wherein each sub-flow operator is bound to other operators in the first data flow through at least one input port of the sub-flow operator and at least one output port of the sub-flow operator;

for each located sub-flow operator, retrieving the sub-flow corresponding to the sub-flow operator;

injecting the corresponding sub-flows into the first data flow, wherein injecting each sub-flow comprises:

copying each operator in the sub-flow, renaming each operator in the sub-flow, to form renamed operators, and inserting the renamed operators into the first data flow, thereby replacing the sub-flow operator in the first data flow;

bridging at least the one input port and the one output port of the sub-flow operator to ports of operators in the first data flow; and sending the first data flow for code generation, wherein the code generation comprises generating application source code representing the first data flow;

wherein traversing the first data flow to locate sub-flow operators comprises: reading an operator;

determining if the operator is a sub-flow operator; and repeating the reading and determining steps until all the operators in the data flow are read;

wherein the first operation further comprises:

in response to a determination that at least one sub-flow operator was encountered, repeating the traversing, retrieving, and injecting steps.

17. The computer-implemented method of claim 16, further comprising performing a second operation to process the mixed data flow, the second operation comprising:

classifying the mixed data flow operators according to operator type, wherein classifying mixed data flow operators according to operator type comprises separating the mixed data flow operators in the mixed data flow based on the respective runtime environment associated with each of the mixed data flow operators;

segregating the mixed data flow operators into regions, each region being a data flow that contains operators of the same operator type, such that each mixed data flow operator in a particular region is executable by one of the plurality of runtime environments associated with the particular region; and sequencing the execution of the regions in a manner that ensures satisfaction of dependency between the mixed data flow operators.

18. The computer implemented method of claim 17, wherein classifying the mixed data flow operators further comprises:

creating a queue;

maintaining a table of operator type and current sequence for each mixed data flow operator in the mixed data flow;

retrieving a list of mixed data flow operators in the data flow;

responsive to determining that the mixed data flow operator has outgoing links, looking up the operator type in the table and assigning the mixed data flow operator a sequence and adding the mixed data flow operator to the queue;

responsive to mixed data flow operators being in the queue, assigning the mixed data flow operator a sequence;

wherein the second operation further comprises:

responsive to determining the mixed data flow operator does not have outgoing links, performing the assigning step;

wherein the assigning the mixed data flow operator further comprises:

setting a next operator in the queue as a parent operator;

responsive to determining the parent operator has a child operator, determining whether the operator type of the parent operator is the same as the operator type of the child operator;

responsive to determining that the operator type of the parent operator is not the same as the operator type of the child operator and responsive to the sequence of the child operator being less than the sequence of the parent operator, setting the sequence of the child operator equal to the sequence of the parent operator;

adding the child operator to the queue.

19. The computer implemented method of claim 18, further comprising:

responsive to determining that the operator type of the parent operator is not the same as the operator type of the child operator, setting the sequence of the child operator equal to the a current order for the operator type of the child operator; and responsive to determining the sequence of the child operator is less than the sequence of the parent, retrieving a next sequence for the child;

wherein the retrieving the next sequence for the child comprises: setting the sequence of the child operator equal to the sequence for the operator type of the child operator;

setting the sequence of the child operator equal to the sequence plus a number of operator types;

storing the sequence in the table; and returning the sequence;

wherein segregating the mixed data flow operators comprises inserting staging terminals between the regions;

wherein segregating the mixed data flow operators further comprises, in a first instance:

setting a sequence equal to the sequence of a mixed data flow operator and setting a region equal to the region associated with the sequence;

responsive to determining the region is not associated with the sequence, creating a new region and assigning the new region to the sequence of the mixed data flow operator, setting a region type equal to an operator type corresponding to the mixed data flow operator; and adding the mixed data flow operator to the new region.

20. The computer implemented method of claim 19, wherein sequencing the execution of the regions further comprises:

sorting the regions in descending order of a sequence number associated with each of the regions;

wherein the classifying step and segregating step are performed based on an operator type, a sequence, and dependencies, wherein the mixed data flow is any of a logical operator graph and a user data flow;

wherein segregating the mixed data flow operators further comprises, in a second instance:

setting a source operator for a link equal to a link source operator, setting a target operator for the link equal to a link target operator, setting a source region equal to the region of the source operator, and setting a target region equal to the region of the target operator; and responsive to determining the source region is equivalent to the target region, breaking the link between the source operator and the target operator, adding a target staging terminal to the source region and linking the source operator to the target staging terminal, adding a source staging terminal to the target region and linking the source staging terminal to the target operator.

21. The computer-implemented method of claim 20, wherein the mixed data flow includes an execution dependency between a first operator and a second operator, the first operator comprising the given operator, the second operator comprising the another operator, the execution dependency specifying that the second operator is to execute only after the first operator has finished executing, wherein the execution plan graph is generated from the mixed data flow via a third operation, the third operation comprising:

generating a metadata representation of the mixed data flow in order to produce a logical operator graph, wherein generating the metadata representation comprises:

classifying the operators into groups according to the execution dependencies and the plurality of runtime engines, wherein at least one of the groups comprises a sequence of operators in the mixed data flow that is supported by a single runtime engine type, wherein the operators are classified to preclude any circular execution dependency among the groups;

determining, based on the groups and the execution dependencies, an order in which to execute the groups; and optimizing at least one of the groups based on the runtime engine of the at least one of the groups;

generating a set of code units from the metadata representation, wherein each code unit in the set of code units is executable on the plurality of runtime engines; and processing the set of code units in order to produce the execution plan graph.

22. The computer-implemented method of claim 21, wherein the third operation further comprises: (i) generating the set of code units for each group; and (ii) generating staging code for the staging terminals separating the groups;

wherein processing the set of code units further comprises aggregating the set of code units to build a particular execution plan graph for each group;

wherein the third operation further comprises processing each operator in each of the groups, which in turn comprises: (i) resolving staging with neighboring operators; (ii) generating a number of code units for each operator to form the set of code unit; and (iii) placing the set of code units into the particular execution plan graph for each group;

wherein processing the set of code units further comprises: (i) generating deployment code for preparing one or more runtime engines for execution of the execution plan graph; (ii) generating run code for executing the execution plan graph; and (iii) generating un-deployment code for undoing the effects of the deployment code;

wherein when executing the execution plan graph, each of the groups is executed by one of the plurality of runtime engines associated with the groups;

wherein the third operation further comprises: (i) performing post aggregation processing; (ii) aggregating the particular execution plan graph for each group into the execution plan graph; (iii) adding at least one new runtime engine for executing the execution plan graph; (iv) establishing a group definition for each group; and (v) establishing an operator definition for each operator.

23. A non-transitory computer readable medium containing a program which, when executed, performs an operation to generate code for an integrated data system, the operation comprising:

receiving a mixed data flow containing mixed data flow operators, the mixed data flow operators collectively defining operations to be performed to complete the mixed data flow, wherein a first of a plurality of runtime environments of distinct types is selected to perform a given one of the defined operations, wherein the given operation is dependent on at least one other operation performed in a second of the plurality of runtime environments;

generating, based on the mixed data flow, a logical operator graph containing logical operators independent of the plurality of runtime environments;

converting the logical operator graph to an extended query graph model in which the logical operators are converted to model operators associated with the plurality of runtime environments;

analyzing the extended query graph model in order to pre-optimize code generation to include at least one of chunking and execution parallelism;

subsequent to analyzing the extended query graph model, converting the extended query graph model via code generation by operation of one or more computer processors when executing the program, into an execution plan graph executable on the plurality of different types of runtime environments.

24. A system to generate code for an integrated data system, the system comprising:
   a computer processor;
   a graphical user interface to receive input for creating a mixed data flow containing mixed data flow operators, the mixed data flow operators collectively defining operations to be performed to complete the mixed data flow, wherein a first of a plurality of runtime environments of distinct types is selected to perform a given one of the defined operations, wherein the given operation is dependent on at least one other operation performed in a second of the plurality of runtime environments; and
   a code generation system operably connected to the graphical user interface and executable by the processor to:
      receive the mixed data flow from the graphical user interface;
      generate, based on the mixed data flow, a logical operator graph containing logical operators independent of the plurality of runtime environments,
      convert the logical operator graph to an extended query graph model in which the logical operators are converted to model operators associated with the plurality of runtime environments;
      analyze the extended query graph model in order to pre-optimize code generation to include at least one of chunking and execution parallelism;
      subsequent to analyzing the extended query graph model, convert the extended query graph model via code generation into an execution plan graph executable on the plurality of different types of runtime environments; and
      execute the execution plan graph by an execution engine that invokes a plurality of runtime engines, each runtime engine being of a distinct runtime engine type corresponding to a respective one of the plurality of runtime environments.

\* \* \* \* \*